(12) United States Patent
Bollinger et al.

(10) Patent No.: US 8,250,105 B2
(45) Date of Patent: Aug. 21, 2012

(54) INPUT DATA STRUCTURE FOR DATA MINING

(75) Inventors: Toni Bollinger, Weil der Stadt (DE); Ansgar Dorneich, Holzgerlingen (DE); Christoph Lingenfelder, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 11/671,623

(22) Filed: Feb. 6, 2007

(65) Prior Publication Data
US 2007/0220030 A1    Sep. 20, 2007

(30) Foreign Application Priority Data

Mar. 14, 2006 (EP) ..................................... 06111140
Oct. 4, 2006 (EP) ..................................... 06121742

(51) Int. Cl.
*G06F 7/00* (2006.01)
(52) U.S. Cl. ......... 707/793; 707/796; 707/803; 707/811
(58) Field of Classification Search ........................ None
See application file for complete search history.

(56) References Cited

U.S. PATENT DOCUMENTS

| | | | | |
|---|---|---|---|---|
| 6,618,725 B1 * | 9/2003 | Fukuda et al. | ..................... | 707/6 |
| 6,804,664 B1 * | 10/2004 | Hartman et al. | ....................... | 1/1 |
| 7,548,928 B1 * | 6/2009 | Dean et al. | ............................. | 1/1 |
| 7,630,996 B1 * | 12/2009 | Hershkovich et al. | ................. | 1/1 |
| 2003/0028509 A1 * | 2/2003 | Sah et al. | .......................... | 707/1 |
| 2004/0024790 A1 * | 2/2004 | Everett | ........................... | 707/200 |
| 2006/0106797 A1 * | 5/2006 | Srinivasa et al. | ................... | 707/6 |

OTHER PUBLICATIONS

Agrawal, R. and R. Srikant. "Fast Algorithms for Mining Association Rules". Proceedings of the 20th VLDB Conference, pp. 487-499. Santiago, Chile,1994.

Ayres, Jay et al. "Sequential Pattern Mining Using a Bitmap Representation". Proceedings of the 8th ACM SIGKDD Int'l. Conference, pp. 429-435. ACM Press, New York, NY, 2002.

Yin-Fu Huang et al: "Mining generalized association rules using pruning techniques" Data Mining, 2002. Proceedings. 2002 IEEE International Conference on Maebashi City, Japan Dec. 9-12, 2002, Los Alamitos, CA, USA,IEEE Comput. Soc. US, Dec. 9, 2002, pp. 227-234, XP010805120 ISBN: 0-7695-1754-4.

(Continued)

*Primary Examiner* — Debbie Le
*Assistant Examiner* — Anh Tai Tran
(74) *Attorney, Agent, or Firm* — Mollborn Patents, Inc.; Fredrik Mollborn

(57) ABSTRACT

Methods and apparatus, including computer program products, implementing and using techniques for compressing data included in several transactions. Each transaction has at least one item. A unique identifier is assigned to each different item and, if taxonomy is defined, to each different taxonomy parent. Sets of transactions are formed from the several transactions. The sets of transactions are stored using a computer data structure including: a list of identifiers of different items in the set of transactions, information indicating number of identifiers in the list, and bit field information indicating presence of the different items in the set of transactions, said bit field information being organized in accordance with the list for facilitating evaluation of patterns with respect to the set of transactions. A data structure for compressing data included in a set of transactions is also provided.

32 Claims, 22 Drawing Sheets

OTHER PUBLICATIONS

Pradeep Shenoy et al.: "Turbo-charging vertical mining of large databases" Proceedings of the 2000 ACM SIGMOD International Conference on Management of Data, 2000, pp. 22-33, XP002431507 Dallas, Texas, United States.

Srikant R et al: "Mining Generalized Association Rules" Proceedings of the International Conference on Very Large Data Bases, Sep. 11, 1995, pp. 407-419, XP000671664.

Mohammed J. Zaki et al.: "Fast vertical mining using diffsets" Proceedings of the Ninth ACM SIGKDD International Conference on Knowledge Discovery and Data Mining, 2003, pp. 326-335, XP002431508 Washington, D.C., US.

PCT—International Searching Authority: "Invitation to pay additional fees" communication in counterpart PCT application PCT/EP2007/051025, May 25, 2007.

PCT—International Search Report and The Written Opinion of the International Search Authority. PCT application: PCT/EP2007/051025. Mailed Nov. 14, 2007.

* cited by examiner

| 300a | Parent pattern |
|---|---|
| | {items_1}, {items_2}, ..., {items_n} |

| 301 | Child pattern |
|---|---|
| | {items_1}, {items_2}, ..., {items_n. new_item} |

FIG. 3A

| 300a | Parent pattern |
|---|---|
| | {items_1}, {items_2}, ..., {items_n} |

| 311 | Child pattern |
|---|---|
| | {items_1}, {items_2}, ..., {items_n} ..., {new_item} |

FIG. 3B

| 300b | Parent pattern |
|---|---|
| | {items_1}, {item_2} |

| 321 | Child pattern |
|---|---|
| | {items_1, new_item}, {item_2} |

FIG. 3C

```
(130) BITFIELD_N findActiveTAs( TAGROUP g,
                                ITEM[] itemIDs,
                                ITEM numberOfItems )
         {
(131)      BITFIELD_N activeTAs := all N bits set to 1;
(132)      ITEM itemPosi_g := 0;
           ITEM itemPosi := 0;
(134)      while (itemPosi_g < g.numberOfDifferentItems())
           {
(136)         if (g.itemID[itemPosi_g] < itemIDs[itemPosi])
              {
(137)               itemPosi_g := itemPosi_g + 1;
              }
(138)         else if (g.itemID[itemPosi_g] > itemIDs[itemPosi])
              {
                 return 0;
              }
(140)         else
              {
(141)            activeTAs := activeTAs & g.bitField[itemPosi_g];
(142)            itemPosi_g := itemPosi_g + 1;
                 itemPosi := itemPosi + 1;
(144)            if (itemPosi = numberOfItems) return activeTAs;
              }
           }
(146)      return 0;
         }
```

FIG. 10B

```
(150)   inline int count1Bits( unsigned long long bitField )
        {
(152)     unsigned char* p = (unsigned char*)(&bitField);
(153)     int nbItems = nb1Bits[ *p++ ];
(154)     nbItems += nb1Bits[ *p++ ];
          nbItems += nb1Bits[ *p++ ];
          nbItems += nb1Bits[ *p++ ];
          nbItems += nb1Bits[ *p++ ];
          nbItems += nb1Bits[ *p++ ];
          nbItems += nb1Bits[ *p++ ];
          nbItems += nb1Bits[ *p ];
(156)     return nbItems;
        }
(160)   const unsigned char nb1Bits[256]
          = { 0, 1, 1, 2, 1, 2, 2, 3, 1, 2, 2, 3, 2, 3, 3, 4,
              1, 2, 2, 3, 2, 3, 3, 4, 2, 3, 3, 4, 3, 4, 4, 5,
              1, 2, 2, 3, 2, 3, 3, 4, 2, 3, 3, 4, 3, 4, 4, 5,
              2, 3, 3, 4, 3, 4, 4, 5, 3, 4, 4, 5, 4, 5, 5, 6,
              1, 2, 2, 3, 2, 3, 3, 4, 2, 3, 3, 4, 3, 4, 4, 5,
              2, 3, 3, 4, 3, 4, 4, 5, 3, 4, 4, 5, 4, 5, 5, 6,
              2, 3, 3, 4, 3, 4, 4, 5, 3, 4, 4, 5, 4, 5, 5, 6,
              3, 4, 4, 5, 4, 5, 5, 6, 4, 5, 5, 6, 5, 6, 6, 7,
              1, 2, 2, 3, 2, 3, 3, 4, 2, 3, 3, 4, 3, 4, 4, 5,
              2, 3, 3, 4, 3, 4, 4, 5, 3, 4, 4, 5, 4, 5, 5, 6,
              2, 3, 3, 4, 3, 4, 4, 5, 3, 4, 4, 5, 4, 5, 5, 6,
              3, 4, 4, 5, 4, 5, 5, 6, 4, 5, 5, 6, 5, 6, 6, 7,
              2, 3, 3, 4, 3, 4, 4, 5, 3, 4, 4, 5, 4, 5, 5, 6,
              3, 4, 4, 5, 4, 5, 5, 6, 4, 5, 5, 6, 5, 6, 6, 7,
              3, 4, 4, 5, 4, 5, 5, 6, 4, 5, 5, 6, 5, 6, 6, 7,
              4, 5, 5, 6, 5, 6, 6, 7, 5, 6, 6, 7, 6, 7, 7, 8
            };
```

FIG. 10C

```
BITFIELD_N findActiveTAs( TAGROUP g, ITEM[] itemIDs, ITEM
    numberOfItems )
{
  BITFIELD_N activeTAs := all N bits set to 1;
  ITEM itemPosi_g := 0;
  ITEM itemPosi := 0;
  while (itemPosi_g < g.numberOfDifferentItems())
  {
    if (g.itemID[itemPosi_g] < itemIDs[itemPosi])
    {
      itemPosi_g := itemPosi_g + 1;
    }
    else if (g.itemID[itemPosi_g] > itemIDs[itemPosi])
    {
      return 0;
    }
    else
    {
      activeTAs := activeTAs & g.bitField[itemPosi_g];
      itemPosi_g := itemPosi_g + 1;
      itemPosi := itemPosi + 1;
      if (itemPosi = numberOfItems) return activeTAs;
    }
  }
  return 0;
}
```

FIG. 12B

```
BITFIELD_N findActiveTAs( TAGROUP g, ITEMID itemID, int&
    itemPosi )
{
  while (itemPosi < g.numberOfDifferentItems())
  {
    if (g.itemID[itemPosi] < itemID)
    {
      itemPosi := itemPosi + 1;
    }
    if (g.itemID[itemPosi] > itemID) {
      itemPosi := g.numberOfDifferentItems();
    }
    else {
      return g.bitField[itemPosi];
    }
  }
  return 0;
}
```

FIG. 12C

```
(130)   BOOLEAN findItemPosisInData( TAGROUP g,
                                     CANDIDATERULE r,
                                     INTEGER[][] itemPosis )
        {
(131)     INTEGER itemPosi_g := 0;
          INTEGER itemPosi_r := 0;
(133)     INTEGER[] mapItemPosis_r_to_g := { 0, ..., 0 };
(134)     while (itemPosi_r < r.numberOfDifferentItems() AND
                 itemPosi_g < g.numberOfDifferentItems())
          {
(135)       if (g.itemID[itemPosi_g] < r.itemID[itemPosi_r])
            {
              itemPosi_g := itemPosi_g + 1;
            }
(137)       else if (g.itemID[itemPosi_g] > r.itemID[itemPosi_r])
            {
(138)         return FALSE;
            }
(139)       else
            {
              mapItemPosis_r_to_g[ itemPosi_r ] := itemPosi_g;
              itemPosi_g := itemPosi_g + 1;
              itemPosi_r := itemPosi_r + 1;
            }
(142)     }
(143)     if (itemPosi_r < r.numberOfDifferentItems())
          {
(144)       return FALSE;
          }

(145)     for( INTEGER itemset := 0 to r.numberOfItemsets()-1 )
          {
            for( INTEGER i := 0 to r.numberOfItems( itemset )-1 )
            {
(147)         itemPosis[ itemset ][ i ]
                 := mapItemPosis_r_to_g[ r.itemPosi( itemset, i ) ];
            }
          }
          return TRUE;
        }
```

FIG. 13B

```
(150)   INTEGER supports( TAGROUP g,
                          INTEGER[][] itemPosis,
                          INTEGER numberOfItemsets )
        {
(151)     INTEGER nbTAs := g.numberOfTAsInGroup();
(152)     INTEGER itemset := 0;
(153)     INTEGER TAPosi := 0;
(154)     BITFIELD_NTAs activeTAs := 0;
(155)     for( itemset := 0 to numberOfItemsets-1 )
          {
(156)       activeTAs := bits from TAPosi to nbTAs-1 set to 1;
(157)       for( all item posis 'i' in itemPosis[itemset] )
            {
(158)         activeTAs := activeTAs &
                           g.bitField( itemPosis[itemset][i] );
            }
(159)       if (activeTAs = 0)
            {
              return 0;
            }
(161)       TAPosi := (position of first 1-bit in activeTAs) + 1;
          }
(162)     return 1;
        }
```

FIG. 13C

INPUT DATA STRUCTURE FOR DATA MINING

CROSS REFERENCE TO RELATED APPLICATIONS

The present application claims priority under 35 U.S.C. 119(a)-(d) from European Patent Application No. EP06111140 entitled "INPUT DATA STRUCTURE FOR DATA MINING" filed Mar. 14, 2006, and from European Patent Application No. EP06121742 entitled "INPUT DATA STRUCTURE FOR DATA MINING" filed Oct. 4, 2006, the entire disclosures of which are incorporated herein by reference for all purposes.

BACKGROUND

The present invention relates in general to data mining. In particular, the present invention relates to input data structure for transactional information.

Data mining refers in general to data-driven approaches for extracting information from input data. Other approaches for extracting information from input data are typically hypothesis driven, where a set of hypotheses is proven true or false in view of the input data.

The amount of input data may be huge, and therefore data mining techniques typically need to consider how to effectively process large amounts of data. Consider manufacturing of products as an example. There, the input data may include various pieces of data relating to origin and features of components, processing of the components in a manufacturing plant, how the components have been assembled together. The aim of data mining in the context of manufacturing may be to resolve problems relating to quality analysis and quality assurance. Data mining may be used, for example, for root cause analysis, for early warning systems within the manufacture plant, and for reducing warranty claims. As a second example, consider various information technology systems. There, data mining may further be used for intrusion detection, system monitoring and problem analyses. Data mining has also various other uses, for example, in retail and services, where typical customer behavior can be analyzed, and in medicine and life sciences for finding causal relations in clinical studies.

Pattern detection is a data mining discipline, where the input data are sets of transactions where each transaction includes a set of items. The transactions may additionally be ordered. The ordering may be based on time, but alternatively any ordering can be defined. For example, each transaction may have been given a sequence number. Association rules are patterns describing how items occur within transactions. Sequence rules, on the other hand, refer to a certain sequence of item sets in sequential transactions.

Consider a set of items $I=\{I_1, I_2, \ldots I_m\}$. Let D be a set of transactions, where each transaction T is a set of items belonging to I, $T \subset I$. A transaction T thus contains a set A of items in I if $A \subset T$. An association rule is an implication of the form $A \Rightarrow B$, where $A \subset I$, $B \subset I$, and $AI B=\emptyset$; A is called the body and B the head of the rule. The association rule $A \Rightarrow B$ holds true in the transaction set D with a confidence c, if c % of the transactions in D that contain A also contain B. In other words, the confidence c is the conditional probability p(B|A), where p(S) is the probability of finding S as a subset of a transaction T in D. The rule $A \Rightarrow B$ has support s in the transaction set D, when s% of the transactions in D contain AYB. In other words, the support s is the probability of the union of items in set A and in set B occurring in a transaction.

The aim in data mining is in general to accurately find all association rules and sequence rules meeting user-defined criteria. The user may define a minimum support or confidence for the rules, as very rare or loosely correlated events may not be of importance for some applications. The user may also be interested only in particular items and wants to search only for patterns containing at least one of these interesting items.

There are many techniques for determining association rules and sequence rules based on input data. Typically, search for association rules and sequence rules is based on generation of candidate patterns, which are then evaluated with respect to the input data. Those candidate patterns, which are found to be suitable, are then extended by adding new items to the rule, resulting in new more complex candidate patterns.

As the amount of input data may be huge and the patterns may be complex, there is need to efficiently organize the search through the candidate pattern space and evaluation of candidate patterns in view of the data. The existing techniques may be classified in two classes of algorithms based on the way these techniques proceed through the candidate pattern space. Some filter criteria apply immediately, for example if a defined minimum support is not reached, because these filter criteria are inherited by child patterns. Others, such as the minimum confidence, can only be applied to complete rules, which impede their early application.

The first class of algorithms is the breath-first search. In these algorithms, the search through the candidate pattern space is started from simple patterns having two items. All two item patterns are first generated and evaluated with respect to the input data. Then all three item patterns are generated and evaluated with respect to the input data. Typically each candidate pattern is evaluated against the input data transactions. Unevaluated candidate patterns are typically stored in memory. The input data, on the other hand, is typically not stored in the memory but it is read from the data source. An example of breadth-first search can be found in "Fast Algorithms for Mining Association Rules" by Rakesh Agrawal and Ramakrishnan Srikant, Proc. 20th Int. Conf. Very Large Data Bases (VLDB), 1994.

The second class of algorithms is the depth-first search. In these algorithms, sets of candidate patterns are evaluated by starting from a first seed candidate pattern and evaluating all its siblings before turning to the other candidate patterns. As an example of a depth-first search algorithm, consider the algorithm described in "Sequential pattern mining using a bitmap Representation" by Jay Ayres et al., Proceedings of the ACM SIGKDD International Conference on Knowledge Discovery and Data Mining, 2002, pp. 429-435. In this algorithm, the input data is converted into binary format and stored in memory. Active-data-record histories, which are used to maintain information about which data records (transactions) are relevant for a certain pattern, are also kept in the memory.

These known data mining algorithms have drawbacks in certain situations. Depending on the amount of input data (especially on the average size of transactions) and on the size of the candidate pattern space, the breadth-first search may be slow since many scans on the original data source are needed and since each candidate pattern needs to be evaluated against all transactions. The depth-first search, on the other hand, may run out of memory for large amounts of input data, or—because of the large number of evaluations against the input data—it may be slow when the input data is swapped to the disk.

Evaluation of candidate patterns with respect to the input data forms the core of data mining techniques designed to find patterns. The input data is accessed repeatedly for the evaluation of candidate patterns. Some existing solutions do not perform any pre-processing of the input data; this means that candidate patterns are evaluated with respect to the original input data. An example of this approach is the A-Priori algorithm, discussed in "Fast Algorithms for Mining Association Rules" by Rakesh Agrawal and Ramakrishnan Srikant mentioned above. Some methods pre-process the input data, for example, by replacing original item names, which may be text strings or many-digit integers, by smaller integers. An example of this approach is discussed "Sequential pattern mining using a bitmap presentation" by Jay Ayres et al. mentioned above. Input data processed in this way consumes somewhat less storage than raw input data.

Currently, there are no efficient solutions for compressing input data. Compressed input data would require less storage space, and could thus allow larger input data amounts to be subject to data mining. However, compression of input data may cause difficulties in evaluation of the candidate patterns. There is thus need for an input data format that overcomes at least some of the above mentioned problems.

SUMMARY

In general, in one aspect, the invention provides a data structure for compressing data included in a set of transactions. Each transaction has at least one item. The computer data structure includes a list of identifiers of different items in the set of transactions, information indicating number of identifiers in the list, and bit field information indicating presence of the different items in the set of transactions, said bit field information being organized in accordance with the list for facilitating evaluation of patterns with respect to the set of transactions.

The list of identifiers may comprise identifiers of different taxonomy parents of the different items, and said bit field information may indicate presence of the different items and of the different taxonomy parents in the set of transactions.

The bit field information may comprise one bit for each item—transaction pair, the size of the bit field being the number of identifiers times number of transactions in the set.

The set may contain a predetermined number of transactions, said predetermined number being dependent on hardware.

The set of transactions may belong to a transaction group and each transaction has ordering information, said data structure comprising information indicating number of transactions in the transaction group, and information about the ordering information of the different transactions. The information about the ordering information indicates differences between transactions. The computer data structure can include information indicating the total number of items in the set of transactions.

The computer data structure can include at least one of the following: weight statistics for said different items, and accumulated weight statistics for said set of transactions.

In general, in another aspect, the invention provides methods, apparatus and systems, including computer program products, implementing and using techniques for compressing data included in several transactions. Each transaction has at least one item. A unique identifier is assigned to each different item and, if taxonomy is defined, to each different taxonomy parent. Sets of transactions are formed from the several transactions. The sets of transactions are stored using a computer data structure including: a list of identifiers of different items in the set of transactions, information indicating number of identifiers in the list, and bit field information indicating presence of the different items in the set of transactions, said bit field information being organized in accordance with the list for facilitating evaluation of patterns with respect to the set of transactions.

It is possible to determine item frequencies and, if taxonomy is defined, taxonomy parent frequencies before assigning said unique identifiers, and discard items having item frequency and, if present, taxonomy parent frequency less than a predefined frequency, thereby producing remaining items and remaining transactions. The unique identifiers are assigned to each different remaining item and to each different remaining possible taxonomy parent.

Items and identifiers of the identifiers in said data structures may be ordered in accordance with said identifiers. Each set of transactions may contain a predetermined number of transactions.

Transactions having less remaining items than a predefined number may be discarded before forming the sets of transactions. Remaining transactions may be ordered based on similarity thereof before said step of forming sets.

Each set of transactions may represent a transaction group, identified by each transaction within the group carrying a same transaction group identifier and each transaction having ordering information. Sets of transaction having less remaining items than a predefined number of items or fewer transactions than a predefined number of transactions may be discarded.

In general, in yet another aspect, the invention provides methods, apparatus and systems, including computer program products, implementing and using techniques for detecting patterns in input data containing several transactions. Each transaction has at least one item. The items possibly have taxonomy parents. Input data is provided in computer data structures having a list of identifiers of different items in the set of transactions, information indicating number of identifiers in the list, and bit field information indicating presence of the different items in the set of transactions, said bit field information being organized in accordance with the list for facilitating evaluation of patterns with respect to the set of transactions. A candidate pattern is evaluated using bit map operations on the bit field information of the computer data structures.

Providing input data may mean, for example, reading said data structures from a storage medium or processing input data to form said data structures.

Evaluation information of a parent candidate pattern of said candidate pattern may be taken into account when evaluating said candidate pattern, for example, by evaluating said candidate pattern only with respect to transactions supporting said parent candidate pattern.

It is possible to determine whether items defined by positive item constraints are present in transactions in connection with evaluating the candidate pattern.

Candidate patterns may be evaluated in sets of similar candidate patterns, said set containing at least two candidate patterns, together with respect to the computer data structures. Presence of common items of a set of similar candidate patterns in said computer data structures is determined, and presence of non-common items of the set of similar candidate patterns is then determined in transactions of said computer data structures having said common items.

When evaluating sequence rules, it is determined whether items occur in a same order in the candidate pattern and in transactions of said computer data structures.

DESCRIPTION OF THE DRAWINGS

FIGS. 3a, 3b and 3c show examples of generation of similar candidate patterns based on a common parent pattern in accordance with one embodiment of the invention.

FIGS. 10a, 10b and 10c show a flowchart of a method for verifying association rules with respect to compressed input data and details for the method in accordance with one embodiment of the invention.

FIGS. 12a, 12b and 12c show a more detailed flowchart of a method for verifying association rules in sets of similar association rules with respect to compressed input data and details for the method in accordance with one embodiment of the invention.

FIGS. 13a, 13b and 13c show a flowchart of a method for verifying sequence rules with respect to compressed input data and details for the method in accordance with one embodiment of the invention.

Like reference symbols in the various drawings indicate like elements.

DETAILED DESCRIPTION

In the following description, data mining by determining patterns in input data is discussed. In the following description, the term "pattern" refers to sequences, to association rules and/or to sequence rules. Evaluation of candidate patters may be part of any data mining algorithm, where candidate patterns are evaluated against input data. The data mining methods based on depth-first and the breadth-first approach, for example, are applicable to be used in connection with the present invention. It is appreciated that should a data mining method maintain evaluation information of parent candidate patterns, this evaluation information can efficiently be taken into account in evaluating candidate patterns.

It is appreciated that the present invention relates to the specified data structures, to methods for compressing raw input data into such data structures and to methods for evaluation pattern candidates with respect to such data structures. Input data to a method for evaluation of pattern candidates may be provided as raw input data. In this case, the method for evaluating candidate patterns contains a step of compressing the raw input data into the specified format. Alternatively, a method for evaluating candidate patterns may simply have access to compressed input data, which is already in the specified format.

Embodiments of the invention employ at least one of the following features: evaluating candidate patterns in sets of similar candidate patters; efficiently storing evaluation information of parent candidate patterns; compressing input data efficiently into a binary format; evaluating candidate patterns with respect to compressed input data; handling weighting information; and dynamically managing memory in data mining applications.

Figure 1:
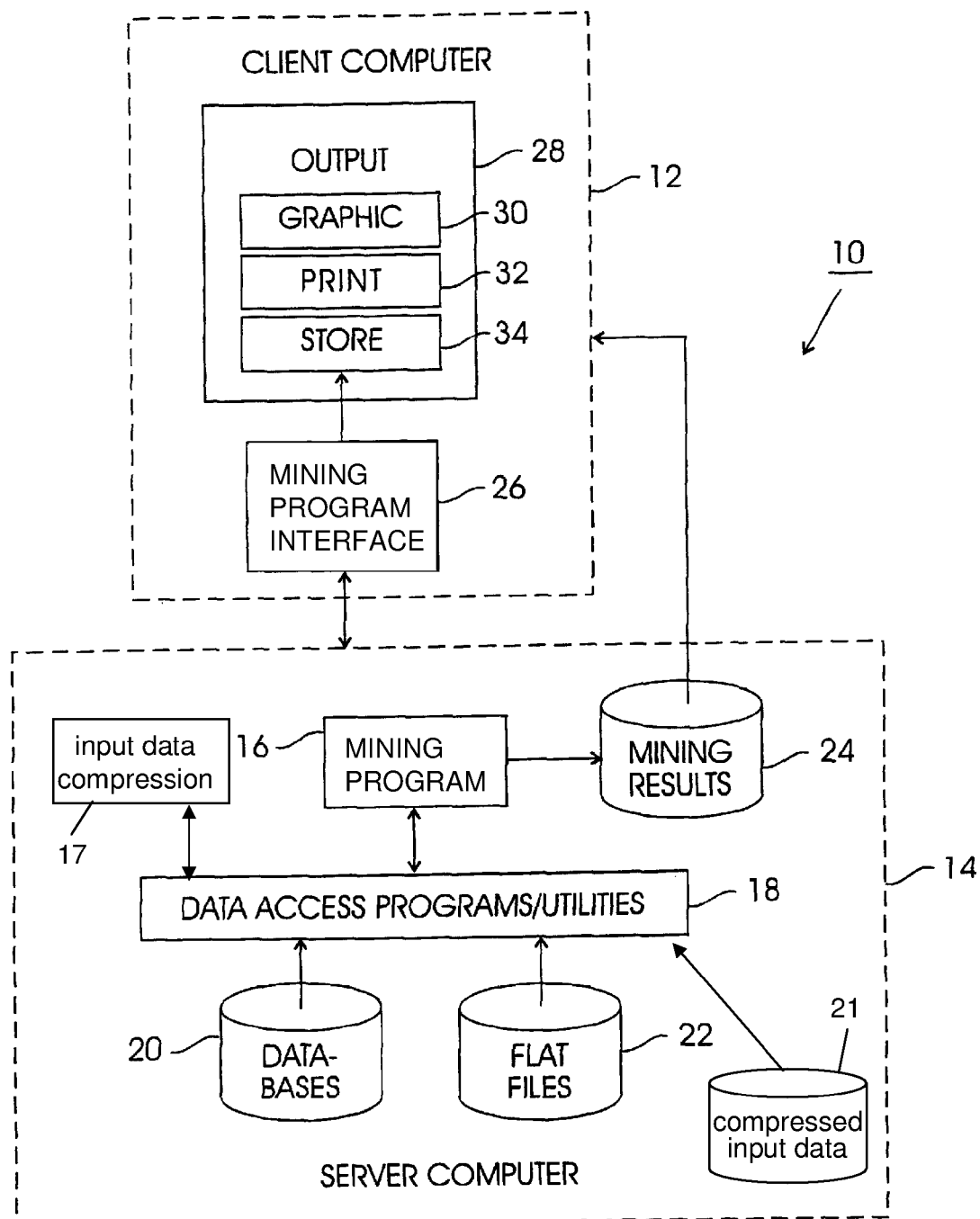
FIG. 1 schematically shows a computing system that may be used for data mining in accordance with one embodiment of the invention.

FIG. 1 shows a computer system 10 which may be used for mining databases or other input information sources. In particular, the computer system 10 may be used for data mining and/or processing input data in accordance with embodiments of the present invention. In the particular computer architecture shown in FIG. 1, the system 10 may include one or more digital information processing apparatus, such as a client computer 12 and a server computer 14. The server computer may be a mainframe computer made by IBM Corp. of Armonk, N.Y., and use multitasking operating system as that sold under the trademark z/OS. The server computer 14 may alternatively be a UNIX computer, a Windows NT Server or an IBM RS/6000 workstation using the AIX operation system. The server computer 14 may include a database system, such as DB2 or ORACLE, or it may have data in files on some other data storage medium. It is apparent that other architectures that mentioned above or shown in FIG. 1 may be used. For example, the functions of the client computer 12 may be incorporated to the server computer 14 and vice versa. The server computer 14 may be a cluster of server computers.

As shown, the operating system of the server computer 14 may host a data mining program/functionality 16 which may be executed by a processor within the server computer 14 as a series of computer-executable instructions. These computer-executable instructions may reside in the memory, for example, in the RAM (random access memory) of the server computer 14 or on the hard-disk of the server computer 14. Alternatively, the instructions may be contained in a data storage device with a computer readable medium, such as a magnetic computer diskette, an optical disk, or a device called a memory stick. The instructions may be provided in the form of a computer program product, typically embodied on a computer readable medium.

FIGS. 2-14 relate to various functionalities applicable in data mining. Those skilled in the art appreciate that methods and data structures described with reference to these figures can be implemented in the data mining program 16 or in a possibly separate input data compression program 17. Alternatively, some features of the invention may be implemented in hardware. Also a suitable combination of software and hardware may be used for providing a device suitable to carry out a method in accordance with an embodiment of the present invention. The input data compression program 17 may reside in separate server computer than the data mining program 16.

Returning to FIG. 1, data access programs and utilities 18 typically enable the data mining program 16 to access one or more databases 20, compressed input data 21, and/or flat files (that is, text files) 22 which contain data about one or more transactions. Alternatively, the data access programs and utilities 18 may retrieve the data from a remote database server not residing on the server computer 14, or the mining program 16 may be embedded in the database 20. The compressed input data 21 may reside in the memory and/or disk of the server computer 14. The data mining program 16 typically outputs the found patterns, or at least those patters which are of interest to a user. The found patterns may be stored in the databases 20 or in a separate results repository 24, which may be accessed by the client computer 12.

As FIG. 1 shows, the client computer 12 may include a data mining interface 26 which, like the data mining program, may be implemented in suitable computer program code. Among other things, the interface functions as an input mechanism for establishing criteria for patterns (for details, see discussion on these criteria below). Furthermore, the client computer 12 preferably includes an output module 28 for outputting/displaying the results stored in the results repository 24 on a graphical display 30, to a printing mechanism 32 or to a data storage medium 34.

In the following, functional features of the data mining program 16 are discussed in detail. Common notations and concepts in data mining are discussed first.

Regarding the input data, there is a set of items I and a set D of transactions T as described above in connection with the related art. There are typically two nested grouping levels of these items. All items which occur simultaneously form a single transaction T (or, in other words, an item set). Typically, each transaction T has a unique transaction identifier TA_ID. The TA_ID identifier thus binds together items belonging to a single transaction T. Several transactions or item sets may form a transaction group, identified by an identifier TA_Group_ID. The TA_Group_ID thus binds together some transactions TA. If there is no temporal or other ordering of the transactions, then the second nesting to transaction groups is often missing.

An input data record for data mining thus contains a TA_ID, one or more ITEM values, and an optional TA_Group_ID. As some examples, a TA_ID may represent the time of purchase in customer purchase analysis, date and time of a certain production step or failure, time of a certain web page click, or a distance from a starting point. As some examples of the TA_Group_ID, this identifier may represent a customer identifier in customer analysis, a product identifier in manufacturing and/or quality control, or a user identifier in web usage tracking. The ITEM fields may respectively represent, for example, purchased article identifiers, part or production step identifiers, or web page addresses.

It is furthermore possible that, in addition to the transactional input data, there is defined a taxonomy for the items. Taxonomy refers to additional levels of hierarchy. Taxonomy information states that certain items (taxonomy children) belong to certain item groups (taxonomy parents).

Certain properties of patterns are interesting in order to gauge their statistical or business importance. One specific class of patterns which is particularly relevant for practical problems and purposes are rule patterns. A rule is a predicate of type 'left hand side' → 'right hand side'. The left hand side is called the antecedent part or rule body, the right hand side is called the consequent part or rule head. The semantics of '→' depends on the use case and the type of data which are available. When looking for associations between several items, facts or events, the meaning of '→' is 'is associated with'. When looking for sequence rules, the meaning of '→' is 'happens at a later time than'. Support s and confidence c of association rules have been defined in the section on related art above. In the following, the body of a rule is marked with b and the head of a rule is marked with h. The lift 1 of an association rule $\rho$: $b(\rho) \rightarrow h(\rho)$ measures its statistical significance as the ratio of the confidence of the rule and the expected confidence e of the rule, which can be computed based on the assumption that the items occur statistically independent as $e(\rho)=s(h(\rho))$. So the lift l for an association rule is $l(\rho)=c(\rho)/s(h(\rho))$.

Support, confidence and lift can also be defined for sequence rules. The support value of a sequence rule a indicates the ratio between the number of transaction groups that support $\sigma$ and the total number of transaction groups. The confidence value of a sequence rule $\sigma$ is defined as the ratio between the number of transaction groups that support a entirely and the number of transaction groups that support the body of $\sigma$. Finally, the lift 1 of a sequence rule $\sigma$ is the ratio between the actual support of $\sigma$ and its expected support $e(\sigma)$. So the lift for a sequence rule is $l(\sigma)=c(\sigma)/s(h(\sigma))$.

For practical purposes, it is often necessary to restrict the set of patterns to a manageable size. To do so, it is customary to filter the complete set of patterns according to certain criteria. These criteria are based on numeric properties and on the contents of the patterns. The user may want to limit the number of result patterns to a maximum number by defining a count constraint. As a selection criterion, any of the numeric properties, for example, the confidence or the support can be used. Range constraints allow only patterns within a given value range of a numeric property such as support or confidence. Using range constraints, the number of resulting patterns still depends on the data. Finally, the user may only be interested in patterns having (or not having) certain items in body or head of the pattern. Such constraints are called item constraints. An item, an item set or a pattern is called "frequent" if the support of the item/item set/pattern is above a user-specified minimum support criterion.

As an example, consider the problem of determining the possible cause of malfunctioning output from a computer chip production line. During the manufacturing process, a large number of parameters are measured. These parameters may include the temperature, the number of dust particles per $m^3$ and the name of the company that delivered the semiconductor material. In a subsequent test of the produced chips, it is measured if there are any logical errors in the chip. Among the resulting patterns, there may be rules such as (1) IF 50°<T<60° AND material from company A, then logical errors.
(2) IF logical errors AND few dust particles, then material from company B.

Assume that rule (1) has support=0.02% and confidence 28%, rule (2) having a support of 0.9% and a confidence of 85%. Now rule (1) may be eliminated by a range constraint specifying a minimum support of 0.1%. Rule (2) could be eliminated, because the user set an item constraint allowing only rules with "logical errors" in the rule head.

It is possible that weighting information is defined for the input data. For example, there may be an individual weight associated with each item (or with some items and, for example, a default weight is associated with the rest of the items). The weight can represent cost, price, physical weight, risk, or any other continuous numeric property of the items. For an aggregate of items (that is, for an item set, a rule, a sequence or a sequence rule), the relevant weighting information associated with the aggregate may be item (based) weight or transaction (based) weight.

Item (based) weight for a transaction or a transaction group supporting an aggregate is essentially the sum of weights of those items in a transaction or transaction group that occur in the aggregate. Those items in the transaction (group) that do not occur in the aggregate, do not contribute to the item weight of the transaction (group). Using the item weights for transactions (transaction groups), it is possible to compute the average weight for all supporting transactions. Transaction (based) weight is the sum of weights of all items in a transaction (group) supporting an aggregate. In other words, all individual weights of the items in the transaction (group) contribute to the transaction weight.

Using the weight information, it is possible to define various filter criteria. For single items and for item aggregates, at least the following filter criteria may be relevant: weight, support times weight (total weight over the entire input data), average weight of the transactions that support the item of aggregate and average weight of the transaction groups that support the item or aggregate. For rule patterns having a body (left hand side) and a head (right hand side), additionally the following filter criteria may be relevant: weight of the rule body, weight of the rule head, support times weight for the rule head, support times weight for the rule body, and accessible additional total weight. Support times weight for the rule head is the total weight of the rule head in the input data. This total weight can represent, for example, the overall business value of the rule. Support times weight for the rule body is, similarly, the total weight of the rule body in the input data. This total weight can represent, for example, the overall business value of the antecedent part of the rule. This knowledge can help, for example, to decide whether an item in the consequent part of the rules should or should not be withdrawn from marketing: it can be advantageous to continue selling an article which is not profitable for itself, but which attracts 'good' customers who buy a lot of other profitable articles (namely the articles in the antecedent part of the rule). The accessible additional weight is calculated in the following way: (1−confidence)* absoluteBodySupport*confidence* weightOfHead. Here confidence refers to the confidence of "body ➔ head" rule, and absoluteBodySupport refers to the total support of the body in the input data. This filter criterion can be used, for example, in target marketing: it provides an estimate of the additional revenue that can be made by target mailing all customers for which the rule body is true, but not (yet) the rule head. The number of customer eligible for contacting is (1−confidence)*absoluteBodysupport. One can expect that at maximum a fraction of "confidence" of the contacted customers will positively respond, because this is the general confidence of the rule "body ➔ head". The accessible additional weight thus represents, for example, the upper boundary for achievable additional income of a target marketing campaign.

The following extension may be defined for the PMML 3.1 standard for mining models for incorporating the weight information. A new tag <weight> can be defined at least for the PMML elements <Item>, <Itemset>, <AssociationRule>, <Sequence>, and <SequenceRule>. Tag <Weight> may have at least the following attributes: "mean", "standardDeviation", "min", "max", and "type". The meaning of the "type" attribute may be as follows. "Subset" means that the weight statistics refers to the weight of the aggregate (<Item>, <Itemset>, <AssociationRule>, <Sequence>, <SequenceRule>) itself which contains the <Weight> tag. "Total" means that the weight statistics refers to the average total weight of the transactions (association models) or transaction groups (sequence models) which support the object which contains the <Weight> tag.

Figure 2:
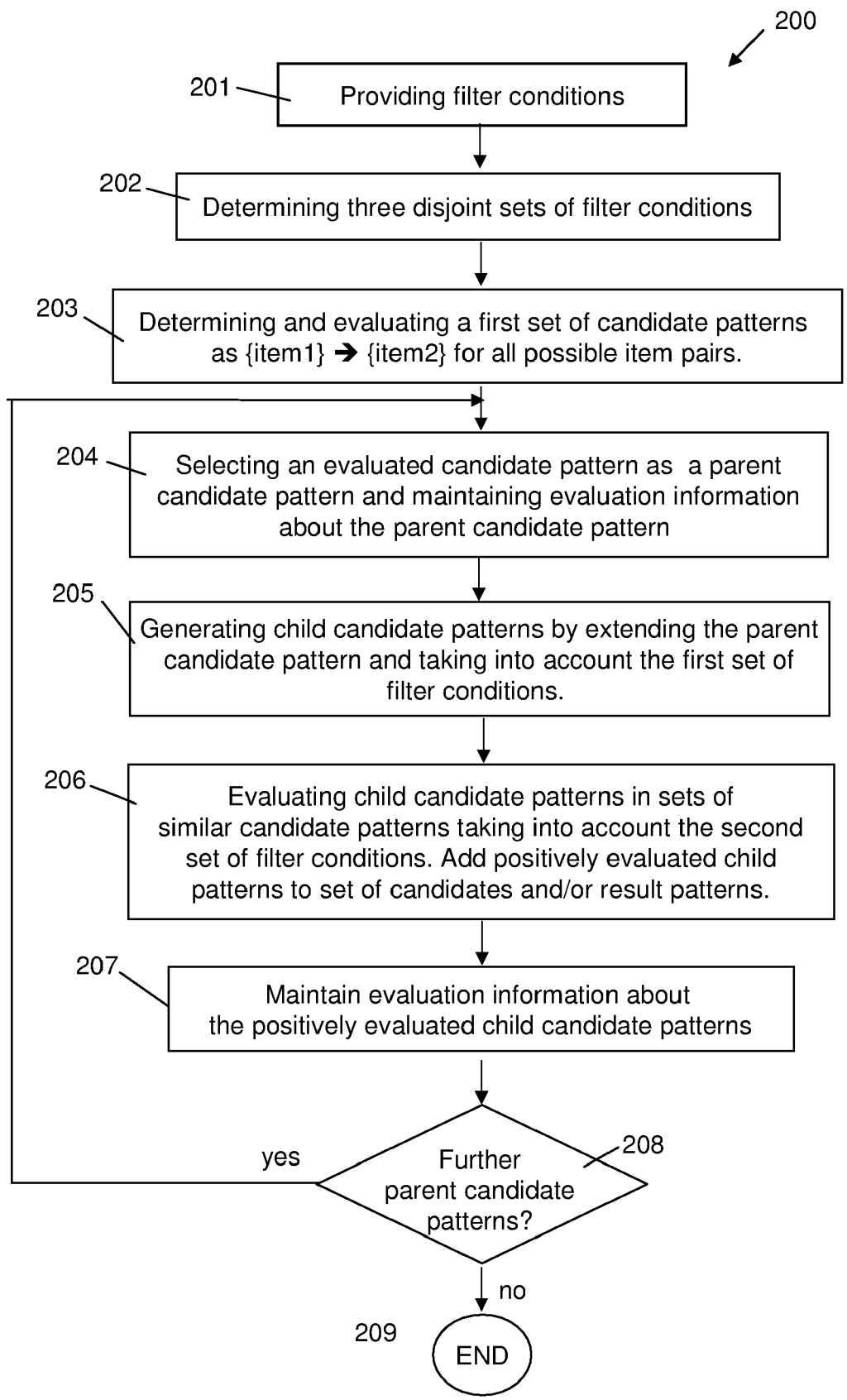
FIG. 2 shows a flowchart of a method where candidate patterns are evaluated with respect to input data in sets of similar candidate patterns in accordance with one embodiment of the invention.

In the following, sequences of item sets are used as patterns, except when checking whether a pattern may be eligible as a result pattern. In the case of association analysis, these sequences can only be of length 2. FIG. 2 shows a flowchart of a method where candidate patterns are evaluated with respect to the input data in sets, each set containing similar candidate data patterns. Thus a set of candidate patterns is evaluated together with respect to the input data. Furthermore, filter conditions for the patterns are taken into account in early stages of generation and evaluation of candidate patterns.

Preferably the candidate patterns in a specific set of candidate patterns differ from one another in exactly one item, the one added to their common parent. Each set of candidate patterns contains up to a predefined number of patterns. This predefined number N is dependent on the computing hardware, where the data mining program is executed. Typical examples of this predefined number are 32, 64 and 128. These numbers allow fast checking of coincidences between candidate patterns and the relevant input transactions, which are stored in a binary format. The optimal value depends on the hardware architecture. The number N is preferably chosen as the maximum number of bits that can be manipulated within one clock cycle by one integer number operation on the computer system on which the mining program is executed. This enables that information for all simultaneously evaluated candidates (that is, for a set of similar candidate patterns) can be efficiently modified and stored within one single unsigned integer variable which is reinterpreted as bit field of length N. For example, for a given transaction (TA) or transaction group (TAG) in the input data, one single such bit field can indicate for which of the N candidates the given TA or TAG contributes to the candidate's support.

The candidate patterns are generated by starting from a common parent candidate, which is extended by one item in different ways. The initial parents are of the form "{item1}, {item2}". They can be extended by adding an item to either set or adding a new set altogether, so that candidates of the following form are generated:

"{item1, newItem}, {item2}"
"{item1}, {item2, newItem}"
"{item1}, {item2}, {newItem}".

FIGS. 3a, 3b and 3c relate to generation of child candidate patterns. In general, the child candidate patterns are generated based on the parent candidate patterns (which may be the seed candidate patterns) typically in the following way. Three elementary expansion steps may be defined for creating child candidate patterns.

The first possible expansion step is to add one new item to the parent's last item set. The added item must not already be present in the parent's last item set. In association rules, the added item must not appear anywhere in the parent rule. FIG. 3a shows an example of a child pattern 301 expanded from a parent pattern 300a.

The second possible expansion step is to append a new item set consisting of one item to the parent pattern. This step is only allowed for sequence rules; the appended item is arbitrary. FIG. 3b shows an example of a child pattern 311 expanded from the parent pattern 300a.

The third possible expansion step is to add one new item to the parent's first item set. The added item must not already be present in the parent's first item set, in association rules the added item must not appear anywhere in the parent rule. This third expansion step is only allowed if the parent candidate pattern has only two item sets and if the second item set has only one item. Without this constraint, the construction path for a given pattern would not be unique, and the same pattern would be constructed and validated at different places in the expansion tree of candidate patterns. FIG. 3c shows an example of a child pattern 321 expanded from a parent pattern 300b.

As a further example, consider a parent pattern {A}, {B}. As an example of the expansion step 1, the following child pattern can be constructed: {A}, {B, C}. As an example of the expansion step 2, the following child pattern can be constructed: {A}, {B}, {C}. As an example of the expansion step 3, the following child pattern can be constructed {A,C}, {B}.

Expansion of a parent pattern is discussed more in connection with FIG. 4 below.

In some embodiments of the invention, a set of similar candidate patterns is evaluated with respect to the input data in one go. As the similar candidate patterns belonging to a set differ from each other only by one item most of the evaluation effort has to be done only once by set, and not once per single candidate. This is a clear advantage to depth-first search, where the full evaluation effort has to be redone for each single candidate.

Returning to FIG. 2, in step 201 the filter conditions for the patterns are provided to the data mining program 16. Typically these are specified by a user via the data mining interface 26. In step 202, the filter conditions are analyzed, to determine a first set of filter conditions, which can be taken into account when generating candidate patterns, a second set of filter conditions, which can be taken into account when evaluating candidate patterns to determine if they are suitable as future parent candidate patterns, and a third set of filter conditions, which can be taken into account when evaluating candidate patterns to determine if they are valid result patterns. The number of filter conditions is not limited in any way.

The first set of filters restricts the set of possible extended patterns. As an example, consider a filter excluding a particular item E from result patterns. Obviously, patterns containing E can never be made valid by further extensions. The second set of filters restricts the set of potential candidate patterns. As an example, consider a filter limiting the number of items in a pattern to m. A pattern containing m items may itself be valid, but it can never remain valid after further extensions. The third set of filters restricts the set of valid patterns. As an example, consider a filter specifying a minimum confidence. A rule generated from a pattern may itself not have enough confidence, but by adding further items, the confidence may increase, so that its child patterns may generate potential result patterns.

The item weight criterion and the transaction/transaction group weight criterion, which were discussed above, can be applied in any of the three sets of the filters. When the item weight criterion and the transaction (group) weight criterion are applied in the first filter set, this maximizes performance. For example, if there is a minimum item weight filter or a minimum transaction weight filter, single items or single transactions can be eliminated from the input data before the candidate rule generation and verification starts.

All other criteria discussed above can be used in the second and third set of filters, i.e. after a candidate rule has been validated against the input data. The following code extract shows how weight filter criteria are applied in the third set of filters.

```
bool passesWeightFilter = true;
double bodyWeight = bodyWeightStats.getMean( );
double headWeight = headWeightStats.getMean( );
double ruleWeight = headWeight + bodyWeight;
```

-continued

```
double TAWeight = TAWeightStats.getMean( );
if (!filter.isInAllowedRange( RuleFilter::BODYWEIGHT,
            bodyWeight ) ||
    !filter.isInAllowedRange( RuleFilter::HEADWEIGHT,
            headWeight ) ||
    !filter.isInAllowedRange( RuleFilter::RULEWEIGHT,
            ruleWeight ) ||
    !filter.isInAllowedRange( RuleFilter::SUPPTIMESWEIGHT,
            support*ruleWeight ) ||
    !filter.isInAllowedRange( RuleFilter::TOTALWEIGHT,
            TAWeight ) ||
    !filter.isInAllowedRange( RuleFilter::ACCESSIBLEVOLUME,
            headWeight*(1.confidence)*absSupport)) {
    passesWeightFilter = false;
}
```

Returning to FIG. 2, next an initial set of candidate patterns is determined and evaluated (step 203). From the set of candidate patterns, in step 204, an evaluated candidate pattern is selected as a parent candidate pattern and evaluation information of this parent candidate pattern is maintained. In step 205, child candidate patterns are generated by expanding the parent candidate pattern and taken into account first filter conditions. Typically this extension is done using at least one of the three expansion steps discussed above. In step 206, the child candidate patterns are evaluated in sets of similar candidate patterns with respect to the input data and taking into account the second set of filter conditions. This evaluation is based on the evaluation information about the parent candidate pattern. Due to the format of the children, being supersets of their parents, only those input transactions need to be visited, that were found to match the parent. Any patterns that are evaluated as potential parents are added to the set of candidate patterns (which is more precisely a stack, not a set). In step 207, evaluation information about these positively evaluated child candidate patterns is maintained for further use. Those patterns evaluated as valid result patterns using the third set of filter conditions are stored as result patterns.

In step 208 it is checked whether there are further candidate patterns which can be used as parent candidate patterns. The method 200 continues to repeat steps 203-208 until all candidate patterns have been evaluated. The processing ends (209) when no further candidate patterns can be used as potential parents.

It is appreciated that various bookkeeping methods may be used to keep track which candidate patterns have already been evaluated and various methods may be used to maintain information about the evaluation information of already evaluated candidate patterns.

Figure 4:
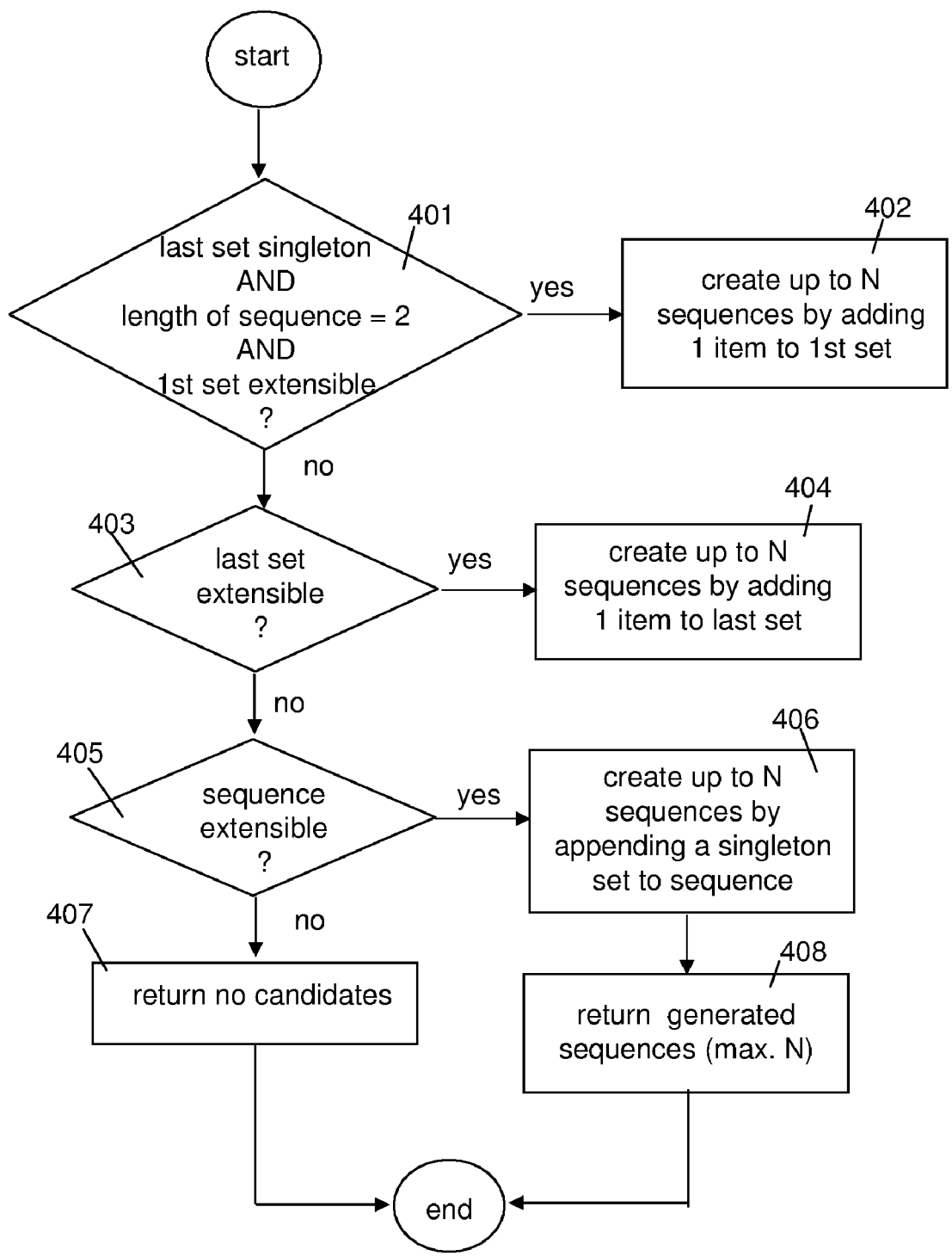
FIG. 4 shows a flowchart of a method for extending a parent pattern into child patterns in accordance with one embodiment of the invention.

The procedure of expanding a parent pattern into child patterns is illustrated in FIG. 4, which fills in the details of step 205 of FIG. 2. The flowchart in FIG. 4 is in line with the three expansion steps discussed in connection with FIGS. 3a, 3b and 3c. In step 401, it is first checked whether the current parent pattern fulfils the following requirements. First, the last item set of the pattern should contain only one item, second, the number of item sets in the pattern is two, and third, the first item set of the pattern should be extensible. In other words, the pattern is of the form $\{I_1, I_2, \ldots I_n\} \rightarrow \{I\}$. If these conditions are fulfilled, in step 402 up to N different but similar patterns are generated by adding one item to the first set of the parent pattern (this is in line with the third expansion step discussed above in connection with FIG. 3c). As discussed above, the value N is a predefined number typically depending on the computer hardware. The actual number of patterns resulting from step 402 may be less than N, depending on the number of items that can be added to the first item set. Thereafter generated up to N child patterns are returned in step 408 for evaluation against input data.

If the conditions in step 401 are not fulfilled, in step 403 it is checked whether the last item set of the parent pattern is extensible. If yes, up to N different but similar child patterns are generated in step 404 by adding one item to the last item set of the pattern. This step 403 is in line with the first extension step discussed in connection with FIG. 3*a*. Thereafter the up to N similar child patterns are returned for evaluation in step 408. If the conditions in step 403 are not fulfilled, a further check is made in step 405. There it is checked whether the parent pattern is extensible by adding a new item to the pattern, either to the head or to the body as shown in FIG. 3*b*. If yes, up to N similar child patterns are created in step 406, and they are returned for evaluation in step 408. If none of the conditions of the steps 401, 403 or 405 can be fulfilled, no return candidates are returned in step 407.

If any one of step 402/404/406 produces more than N possible similar child patterns, bookkeeping is done accordingly and the rest of the child patterns are evaluated in a later round. Typically child patterns originating from different steps 402/404/406 are not evaluated at a go, as the evaluation results may be too different for efficient handling. But in practice there are a lot more than N child patterns generated in steps 402/404/406. It is possible that some of the sets of similar candidate pattern returned in step 408 may contain only one candidate pattern to be evaluated.

Figure 5:
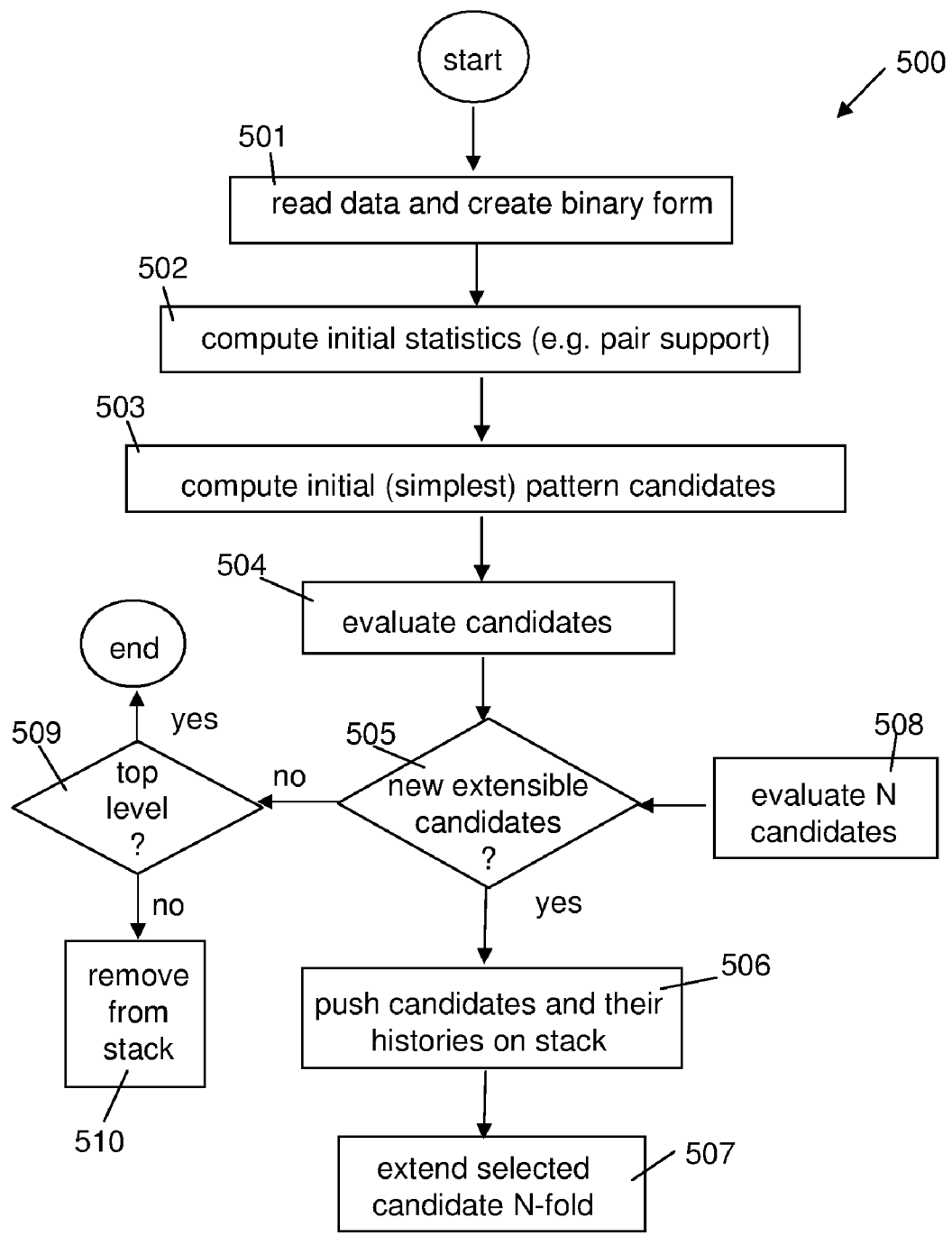
FIG. 5 shows a more detailed flowchart of a method for evaluating candidate patterns in sets of similar candidate patterns in accordance with one embodiment of the invention.

FIG. 5 shows a flowchart of a method 500, where the input data is converted into binary format to save memory and allow more efficient evaluation of sets of candidates. Additionally, initial statistics for the input data are calculated to make the evaluation of candidate patterns more efficient. When evaluating candidates in steps 504 or 508 these initial statistics can be used to eliminate some candidates being supersets of these initial structures, for example pairs of items. Furthermore, the evaluation histories of the candidate patterns are kept in a data structure especially suitable for evaluating the candidate patterns with respect to the binary input data. It is appreciated that although these three features are present in this combination shown in FIG. 5, any one of them may be used on its own or in other feature combinations to fine-tune the method discussed in connection with FIG. 2. In other words, the method shown in FIG. 2 may be enhanced by creating binary form of the input data; compute initial statistics of the input data; and/or use a specific binary data structure for storing the evaluation histories of the candidate patterns. Also combinations of various further features discussed below are possible, as is evident to a skilled person when reading this description.

In step 501, initial statistics are computed for the input data. This step involves a full pass over all input data (for example, in a database table or a flat file). Frequent items and frequent item pairs are collected. A frequent item set F is a subset of the items I that occurs frequently as a subset of the input transactions T. These item and item pair statistics are stored in a data structure, which is preferably an item hash table where 64-bit hashes represent the item names. If one or more taxonomies have been defined on the items, extend the item (pair) statistics to all taxonomy parents of the items found in the input data. In the unlikely case of a hash collision, step 501 is redone and the hash table is recreated with another hash seed. A hash collision is, however, quite unlikely if 64-bit hash values are used. In this case, a hash collision appears on average only once in $10^{19}$ item names. Step 501 can be finalized by throwing away all items and item pairs which are infrequent, that is, less frequent than the user-specified minimum support value, or which are deactivated by another rule filter criterion that has been defined. Each remaining item is assigned an integer item ID between 0 and #frequentItems−1. More precisely, it is also necessary to keep those infrequent items which have a frequent taxonomy parent. These infrequent items get the IDs #frequentItems, #frequentItems+#infrequentItems−1).

If weight information is defined for the input data, item weight statistics may be determined also in step 501. The weight information may be stored, for example, in the item hash table (or other data structure) mentioned above. The item weight statistics typically includes at least mean weight of each item and each taxonomy parent. Additionally, the item weight statistics may include minimum and/or maximum values, standard deviation and/or further information about the statistical distribution (for example, quantiles, skewness, and/or curtosis) for items and taxonomy parents. It is possible to throw away all those items and taxonomy parents whose weight statistics violate a weight-based filter criterion.

In step 502, a binary form of the input data is created. Possible details are discussed below in connection with FIGS. 7*a* to 9*b*. This step involves a second full pass over the input data and transforming the data into a binary representation. In the binary representation, all input data records which belong to one TA_group_ID (or TA_ID if no TA_group_Ds exists) are put in one binary data object (named TAGroup). In this TAGroup binary data object, the textual item values are replaced by 16-bit or 32-bit integer IDs. The infrequent items are completely dropped. These transaction-specific or transaction-sequence-specific binary data objects are organized in several DataPage objects. Each of the DataPage objects has a size of about 2%-5% of the total available RAM memory for the data mining program. The DataPage objects representing the input data normally reside in the RAM, but if there is not enough memory to store all of them simultaneously, each DataPage object can dump itself to the disk and refetch itself transparently when needed again. This dynamic memory management is discussed in more detail in connection with FIG. 14 below.

After carrying out step 502, there is no more need for the item hash table, which was formed in step 501. Each item is now described by its 16-bit (or 32-bit) ID. Therefore, it is possible to throw away the item and item pair hash table and store the remaining frequent item IDs with their frequent pair information and their original (textual) name in a simple array over all frequent item IDs. At this point, the input data is represented by TAGROUP binary objects and an array associating array index (item IDs) with textual names. There is no more need to access the original data source.

In step 503, the initial (seed) candidate patterns are computed as explained above in connection with step 203. In step 504, these initial candidate patterns are evaluated with respect to the input data by using the binary data objects representing the input data. Details of evaluating candidate patterns are explained below in connection with step 508.

In step 505 it is checked, whether there are new extensible candidate patterns. A candidate pattern is extensible when there are more items that can be added and there is no filter condition prohibiting the extension. One such filter condition could be a maximum number of items in a pattern. If the test 505 finds new extensible candidate patterns (from the evaluation in 504), in step 506, these candidate patterns and their evaluation information is pushed on a stack.

In step 507, a selected candidate pattern is extended N-fold using the three extension steps described above. Here it is ensured that no filter condition is violated. Such a filter condition could for instance be that patterns shall not contain both item A and item B.

In step 508, a set of N similar candidate patterns is evaluated with respect to the input data using the binary data objects representing the input data. During the evaluation, the third set of filter conditions is taken into account, which restricts the set of result patterns. For example, all rules that can be generated from a pattern are checked whether their confidence meets the filter. If result patterns are found, they are now stored as part of the final result.

Steps 505-508 are carried out repeatedly until there are no more new extensible candidate patterns. Then the method 500 continues to step 509, where it is checked whether the top level of the candidate patterns was reached. If not, then in step 510 a candidate pattern is removed from the stack. In step 509, this candidate pattern is extended N-fold.

It is appreciated that FIG. 5 shows a combination of the evaluation of candidate patterns in sets of N similar candidate pattern and the use of a binary format for input data. It should be realized, however, that evaluation in sets of N similar candidate patterns increases efficiency irrespectively of the format of the input data. The combination of compressed binary input data format (for example, FIGS. 7a and 7b) and evaluation pattern candidates in sets is very efficient, as discussed below in connection with FIG. 11.

In the following, evaluation information of a parent pattern is referred to as parent history information. The parent history information includes one Boolean value per transaction (TA) or transaction group (TAG) in the input data, indicating whether or not the given TA or TAG contributes to the support of the parent pattern. Those TAs or TAGs or which contribute to the support of a pattern are called here 'active' TAs or TAGs. In the following it is assumed that there are $N_{TOT}$ TAs (in Association Rules Mining) or TAGs (in Sequence Rules Mining) in the input data, and $N_{act}$ of them are active for a given parent pattern.

Figure 6A:
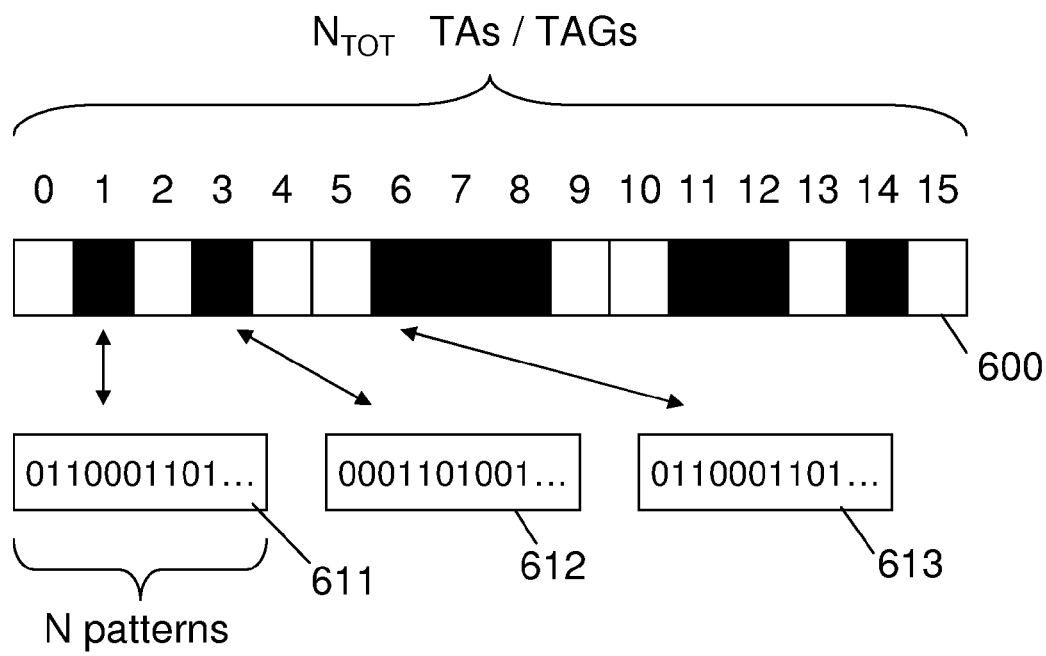
FIGS. 6a, 6b and 6c show procedures for storing evaluation information of parent candidate patterns in accordance with one embodiment of the invention.
Figure 6B:
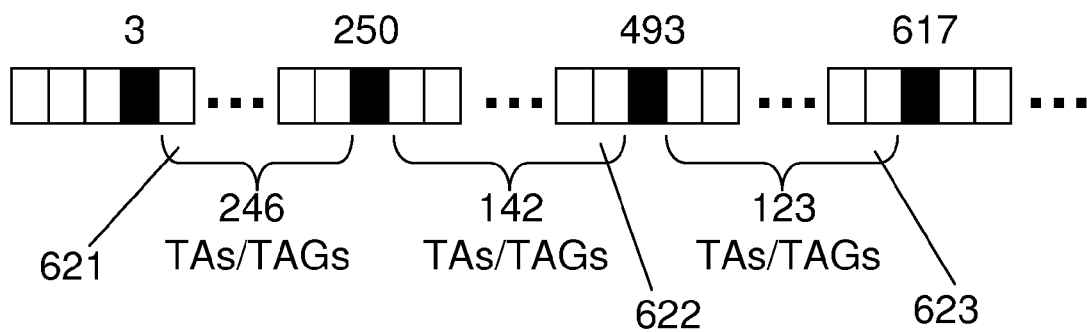

The basic storage scheme for the evaluation information of the parent pattern (that is, for parent history information) could then be the following. The parent history information is stored in one bit field of length $N_{TOT}$, each bit representing one of the $N_{TOT}$ TAs or TAGs, bit=1 represents an active TA or TAG, bit=0 represents an inactive TA or TAG. FIG. 6a shows schematically a bit field 600 having the length of 16 ($N_{TOT}$=16). The parent history information stored in the bit field 600 contains the following information: starting the numbering of TAs or TAGs from 0, TAs/TAGs 1, 3, 6, 7, 8, 11, 12, and 14 contribute to the support of the given parent rule.

As a TA or TAG may contribute to the support a child candidate pattern only if this TA/TAG contributes to the support of the parent pattern, a set of similar candidate pattern expanded from the parent pattern need to be evaluated only against the active TAs/TAGs of the parent pattern. FIG. 5a shows schematically how evaluation information about a set of similar candidate pattern (the set having N candidate patterns) with respect to a TA/TAG can be stored in one single unsigned integer variable which is reinterpreted as bit field of length N. The unsigned integer variable 611 contains information indicating whether TA/TAG number 1 contributes to support for the set of N candidate patterns. Similarly, the unsigned integer variables 612 and 613 contain information on whether TA/TAG numbers 3 and 6 contribute to the support for the set of N similar candidate patterns. The rest of the unsigned integer variables containing evaluation information for the set of N similar candidate patterns are not shown in FIG. 6a.

Regarding storing active parent history information (evaluation information of a parent pattern), some variations are discussed in the following. A first refinement of the scheme shown in FIG. 6a is to choose a 'sparse' storage format if the parent support is sufficiently low. The bitwise storage scheme illustrated in FIG. 6a is in general the most efficient one if $N_{act}/N_{TOT} \geq \frac{1}{8}$, that is if the relative support of the parent pattern is at least 12.5%. The memory consumption is $N_{TOT}/8$ bytes, independent of $N_{act}$. For supports below 12.5%, it is in general more efficient to store the step lengths between adjacent active TAs/TAGs. This is shown schematically in FIG. 6b with an example of a data set of 1000 TAs or TAGs (labeled 0, ..., 999), where the TAs or TAGs 3, 250, 493, and 617 are active, it is possible to store the parent history information in 4 1-byte unsigned integers indicating the number of inactive TAs/TAGs between the active ones: 3, 246 (gap 621 in FIG. 6b), 142 (gap 622), and 123 (gap 623). This is because there are 3 inactive TAs or TAGs before the first active one, 246 inactive TAs or TAGs between the first and the second active one, and so on in the example in FIG. 6b. If a step length≧255 is encountered, the step must be split into two or more partial steps; for example, the step length 510 could be represented as 255, 255, 0. Here the first 255 indicates that the 255 and 0 are sub steps whose values are to be added together. More generally speaking, if step lengths are stored as 1-byte unsigned integers, it can be shown that the required amount of memory never exceeds the value of $N_{act}+((N_{TOT}-N_{act}+256)$ div $256)+(N_{TOT}$ div $65536)$. Hence, memory consumption of this storage format is approximately $N_{TOT}/8$ if the relative parent support is 12.5% and decreases to approximately $N_{TOT}/255$ for very low supports.

As a second refinement it is possible to choose among more than 2 different storage formats, depending on $N_{act}/N_{TOT}$ of the parent pattern currently processed. This second refinement is a generalization of the first refinement discussed in connection with FIG. 6b. For example, one could choose the basic storage scheme for $N_{act}/N_{TOT} \geq 12.5\%$, the sparse format described in Refinement 1 for $12.5\% > M_a/N_{TOT} \geq 0.4\%$ and a second sparse format for $N_{act}/N_{TOT} < 0.4\%$. The second sparse format could be, for example, similar to the sparse format in the first refinement, but with 2-byte unsigned integers storing the step lengths. This new format only requires approximately $2*N_{TOT}/65535$ bytes of memory for very low supports. Typically one format is used for one single active parent history. Using different encodings for different parts may be feasible, if the character of the input data is varying from beginning to end of the input table.

Figure 6C:
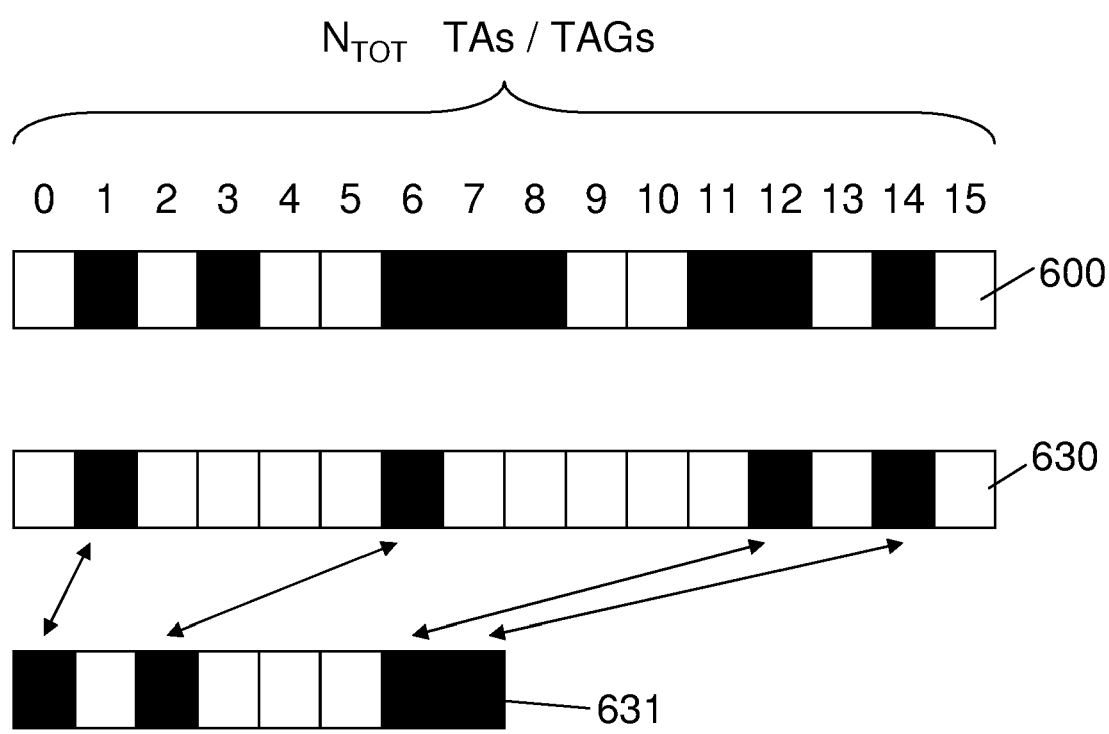

As a third refinement, if the parent pattern under consideration itself has a parent pattern, it is possible to consider only those TAs or TAGs, which are active for the parent's parent. FIG. 6c shows schematically an example on this. In the example in FIG. 6c, the active history information of the parent's parent pattern is shown with the bit field 600. The parent pattern under consideration in FIG. 6c thus has a parent pattern with active history information 600 with $N_{act}$ active TAs or TAGs. A non-refined option for storing active parent history is shown with the bit field 630, where the number of bits is $N_{TOT}$ similarly as in the active parent history 600 of the parent's parent pattern. When recording active history information for the parent pattern associated with the bit field 630, it is possible to replace $N_{TOT}$ by $N_{act}$ in the basic or sparse formats described above. FIG. 6c shows, as an example, a bit field 631 in accordance with the same basic format as is applied for the bit field 600. As FIG. 6c shows, only those TAs or TAGs which are active for the parent's parent (that is, in the bit field 600) are considered in the active history of the parent pattern (that is, in the bit field 631).

Efficient ways to compress the input data into binary format are discussed next. These ways to compress the input data are applicable to use with the pattern evaluation methods discussed above, where sets of similar candidate patterns are evaluated together. In addition, they can be applied to any other data mining method for determining patterns in input data. They are applicable, for example, in data mining based on depth-first search or breadth-first search.

Figure 7A:
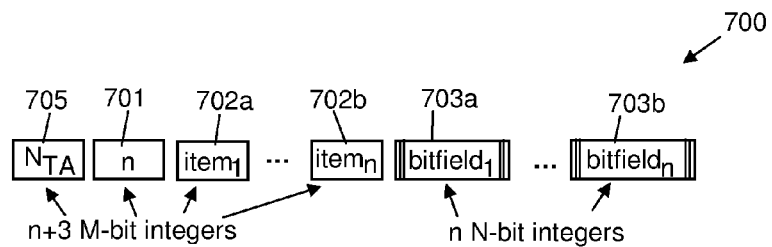
FIGS. 7a, 7b, 7c and 7d show data structures for compressing input data efficiently in binary format in accordance with one embodiment of the invention.
Figure 7B:
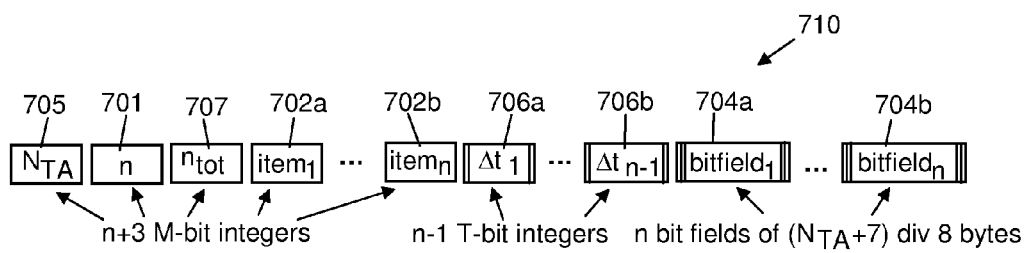
Figure 7C:
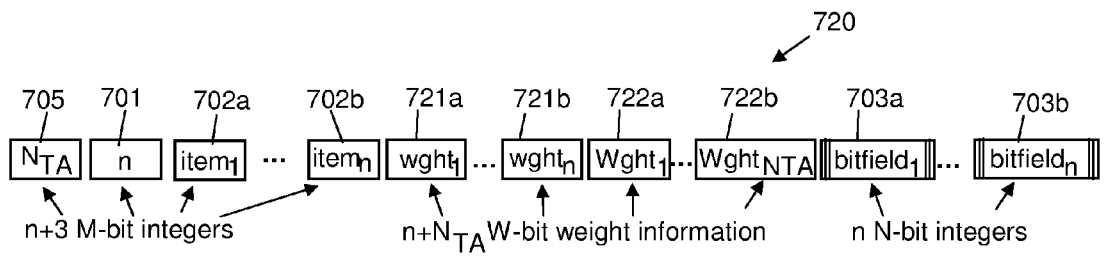
Figure 7D:
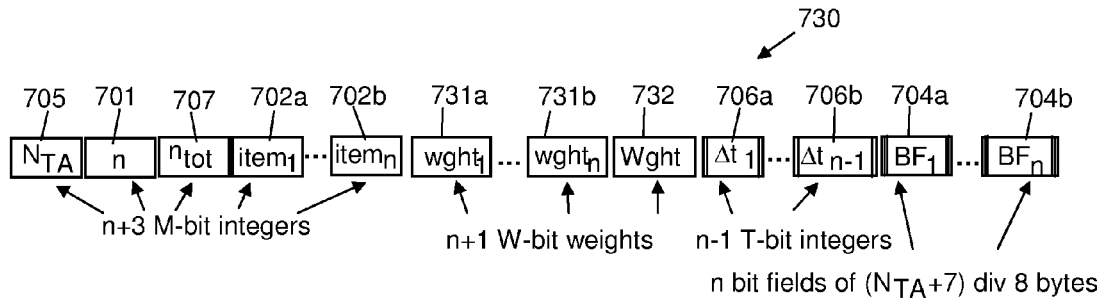

FIGS. 7a to 7d show some computer data structures for compressing input data for data mining purposes. FIG. 7a shows a computer data structure 700, which is especially suitable for input data, where transactions do not contain timing/ordering information or where the timing/ordering information is of no interest and can thus be discarded. FIG. 7b shows a computer data structure 710, which is especially suitable for input data, where transactions have timing/ordering data. In other words, these transactions may be grouped into transaction groups TAG. FIGS. 7c and 7d show similar data structures 720, 730 as FIGS. 7a and 7b, but the data structures 720, 730 contain also weighting information.

Both the data structure 700 and the data structure 710 contain information of a set of transactions. The number of transactions in the data structure 700 is typically a predefined number N, which is dependent on the hardware. N is the length of a bit string that can be handled by the processor in one clock cycle. The number of transactions in the data structure 710 is defined by the number of transactions in the transaction group TAG, which the data structure 710 represents.

The number of different items in the transactions is indicated with an integer n (reference number 701 in FIGS. 7a and 7b). Identifiers 702a, 702b of the different items are also present in the data structures 700 and 710. The identifiers 702 are typically integer values, which are unique within the input data; the minimum requirement is that the identifiers 702 are unique within a data structure 700/710, but this requires additional book-keeping. The identifiers 702 may be selected to be as small integer numbers as possible, and typically they are not more than 16-bit long.

The presence of the different items in the respective transaction is represented by bit field information in the data structures 700/710. There may be a separate bit field for each identifier 702, as FIGS. 7a and 7b illustrate. As a further option, it is possible to have one larger bit field representing the same information as the separate bit fields. Any other modification may also be possible, as long as there is bit field information indicating the presence of the different items in the respective transactions represented by the data structure 700/710. Regarding the data structure 700, where the number of transactions is typically predetermined, the length of the separate bit fields 703a, 703b is also predetermined (in other words, typically N). In the data structure 710, where the number of transactions depends on the number of transaction in the transaction group TAG the data structure is representing, the length of the bit fields 704a, 704b may vary from one data structure 710 to another data structure 710. As FIG. 7b shows, if there is a separate bit field 704 for each identifier 702, the length of the bit fields 704 is $(N_{TA}+7)$ div 8 bytes. The data structure 710 typically contains an integer $N_{TA}$ 705 indicating the number of transactions, to facilitate processing of the data structure.

The data structure 710 contains furthermore ordering information of the transactions represented by the data structure 710. As FIG. 7b shows, the ordering information may be differential (for example, time stamp differences or other distances in ordering information), and in this case the ordering information may be represented by n−1 integers 706a, 706b. Alternatively, there may be n integers indicating the ordering information (for example, time stamps).

The order of the fields in the data structure 700 may be the following: integer 701 indicating the number of different items, identifiers 702 of the different items, and a series of bit fields 703. The data structure 700 may additionally contain, for example, in the beginning of the data structure to facilitate processing of the data structure, an integer 705 indicating the total number of transactions $N_{TA}$ represented by this data structure 700. Typically the integer 705 is N for all other data structures representing the input data except for one, where $1 < N_{TA} < N$.

The order of the fields in the data structure 710 may be the following: integer 705 indicating number of transaction $N_{TA}$, integer 701 indicating the number n of different items, identifiers 702 of the different items, ordering information, and bit field information 704 indicating the presence of the different items in the transactions. The data structure 710 may further contain an integer 707 indicating the total number of items in the transactions. This enables an efficient checking of whether the transaction group can support certain sequences. If the number of items in a sequence is larger than number of items in the transaction group, the pattern cannot be supported.

The data structure 720 in FIG. 7c is, by the way of example, otherwise similar to the data structure 700 in FIG. 7a, but it has additional weighting information. The n storage units 721 contain the weight statistics of each of the n different items. A storage unit 721 may have W bits, and it may be a 32-bit single precision floating number. The weight information storage unit 721 typically contains the average weight of the given item, averaged over all occurrences of this item within the N TAs. The storage unit 721 may additionally contain statistical aggregates such as standard deviation. The average weight expressed by a storage unit 721 may or may not account for multiple occurrences of identical items within one TA. (For example, if a customer buys 4 bottles of milk for 1$ each in one single purchase, the recorded price for the item milk could be either 4$ or 1$, depending on the type of analysis that the mining user wants to do). Optionally, the data structure 720 may contain further storage units 722 which contain the accumulated weight statistics of different TAs. Typically also these storage units 722 are W-bit long, and there is one storage unit 722 for each TA represented by the data structure 720, containing the sum of all weights in the TA.

The data structure 730 in FIG. 7d is, by the way of example, otherwise similar to the data structure 710 in FIG. 7b, but it has additional weighting information. The n storage units 731 contain the weight statistics of each of the n different items. A storage unit 731 may have W bits, and it may be a 32-bit single precision floating number. The weight information storage unit 731 typically contains the average weight of the given item, averaged over all occurrences of this item within the N TAs. The storage unit 731 may additionally contain statistical aggregates such as standard deviation. The average weight expressed by a storage unit 731 may or may not account for multiple occurrences of identical items within one TA. Optionally, the data structure 730 may contain a further storage unit 732 which contain the accumulated weight statistics of the entire transaction group. Typically also the storage units 732 are W-bit long. It is clear that the order of the storage units in the data structure 720 or 730 may be different than the order shown in FIGS. 7c and 7d.

The data structure comprising input data in a compressed format may be embodied on a computer usable medium. Typically the data structures are stored during the evaluation of candidate patterns in the memory of a computer system or in the hard-disk. The data structures may also be stored on a hard disk, or on a removable computer readable medium, such as a magnetic computer diskette, an optical disk, or a device called a memory stick.

The data structures discussed in connection with FIGS. 7a to 7d have at least the following advantages. Firstly, the input data is compressed efficiently. The compression effect is up-to three-fold: (i) the original item names are replaced by small IDs (requiring typically not more than 16 bit of memory each); (ii) not all items in the N TAs have to be stored as 16-bit integers, but each of the different items in these N TAs only once; and (iii) the weight information is compressed, because not every single piece of input data weight information is stored, but only statistical aggregates of weight information. The item-in-TA relations are stored using only one single bit per relation within the bit field information. It is efficient to include the list of different items to the data structure representing a set of transactions because each transaction typically contains only a very small number of all items present in the input data. Hence, the number of different items in the N TAs is typically much smaller than the number of all different items in the data, and referring to the different items in the N TAs considerably reduces the size of the bit fields. If a high data size compression is the goal, then a reordering of the transactions before forming groups is possible, as discussed below. This reordering of transactions has the goal to create series and clusters of transactions which are very similar, i.e. which contain almost the same item IDs. This helps to generate an optimum compression rate. Typically, the data size is reduced to about 5% of the original data size.

Secondly, the storage scheme is able to handle taxonomies efficiently. If there is a rich taxonomy hierarchy on top of each item, traditional storage schemes suffer from considerable blow-up effects. Namely, if there are a certain number of different items and each item has a 3-level parent hierarchy on top, traditional storage schemes are blown up by a factor of 4. In the scheme described here, storage blow-up is smaller because the n items will most probably share some parents, and these shared parents will appear only once in the stored data structure.

Thirdly, verification of candidate patterns with respect to the input data can be done by efficient bit map operations on the bit field information of data structures 700/710/720/730 (see discussion below relating to FIGS. 10a to 12c). This considerably speeds up the verification process. In practical applications, the verification speed is a crucial point. Typical use scenarios for finding patterns on large transactional data can take hours or days, The storage scheme is able to work with active record histories in an efficient way. Furthermore, the storage and verification scheme is well suited for efficiently applying various pattern filter criteria. These features are also discussed in more detail in connection with pattern verification below. The storage scheme works well also with candidate creation and verification mechanisms which create and verify large groups of similar candidate rules simultaneously.

Figure 8:
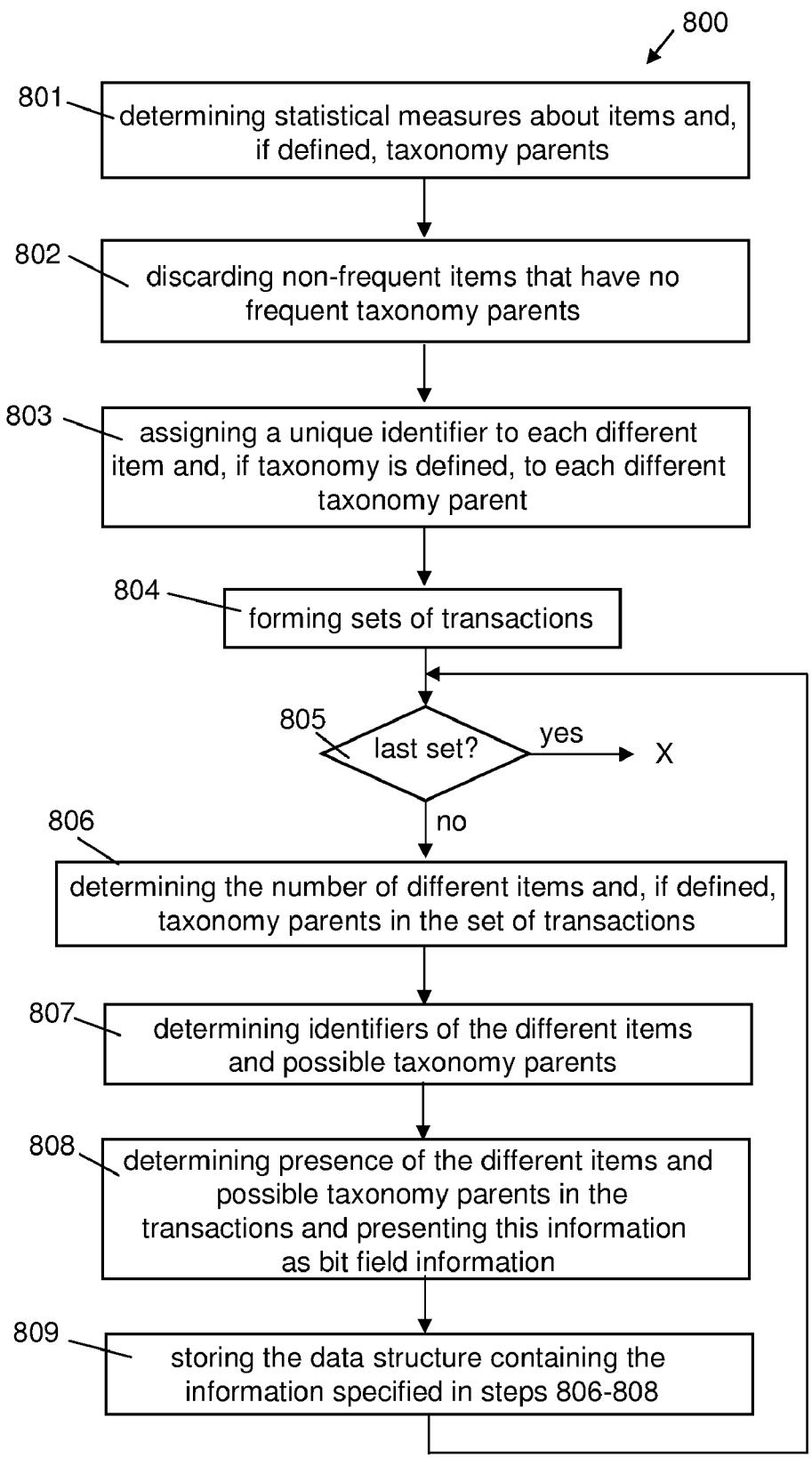
FIG. 8 shows a flowchart of a method for compressing data comprised in a set of transactions into a specific data structure in accordance with one embodiment of the invention.

FIG. 8 shows a flowchart of a method 800 for compressing data comprised in a plurality of transactions. In step 801, statistical measures about the items and possible taxonomy parents are determined. This can be done, for example, using an item hash table storing hash values of the original item identifiers and the frequencies of the items. If taxonomy has been defined, frequencies of all taxonomy parents are calculated and added to the item hash table. In step 802, which is optional, non-frequent items that have no frequent taxonomy parents are discarded. In step 803, a unique identifier is assigned to each different item and, if taxonomy is defined, to each different taxonomy parent. In step 804, sets of transactions are formed. Steps 805 to 809 are repeated for each set of transactions. In step 806, the number of different items in the set of transactions is determined. In step 807, identifiers of the different items are determined. In step 808, the presence of the different items in the transactions belonging to this set of transactions are determined and presented as bit field information. In step 809, a data structure containing the information specified in steps 806-808 is formed and stored. It is evident to a skilled person that further information discussed in connection with FIGS. 7a and 7b may be need to be determined before step 809 for forming the data structures discussed therein.

Figure 9A:
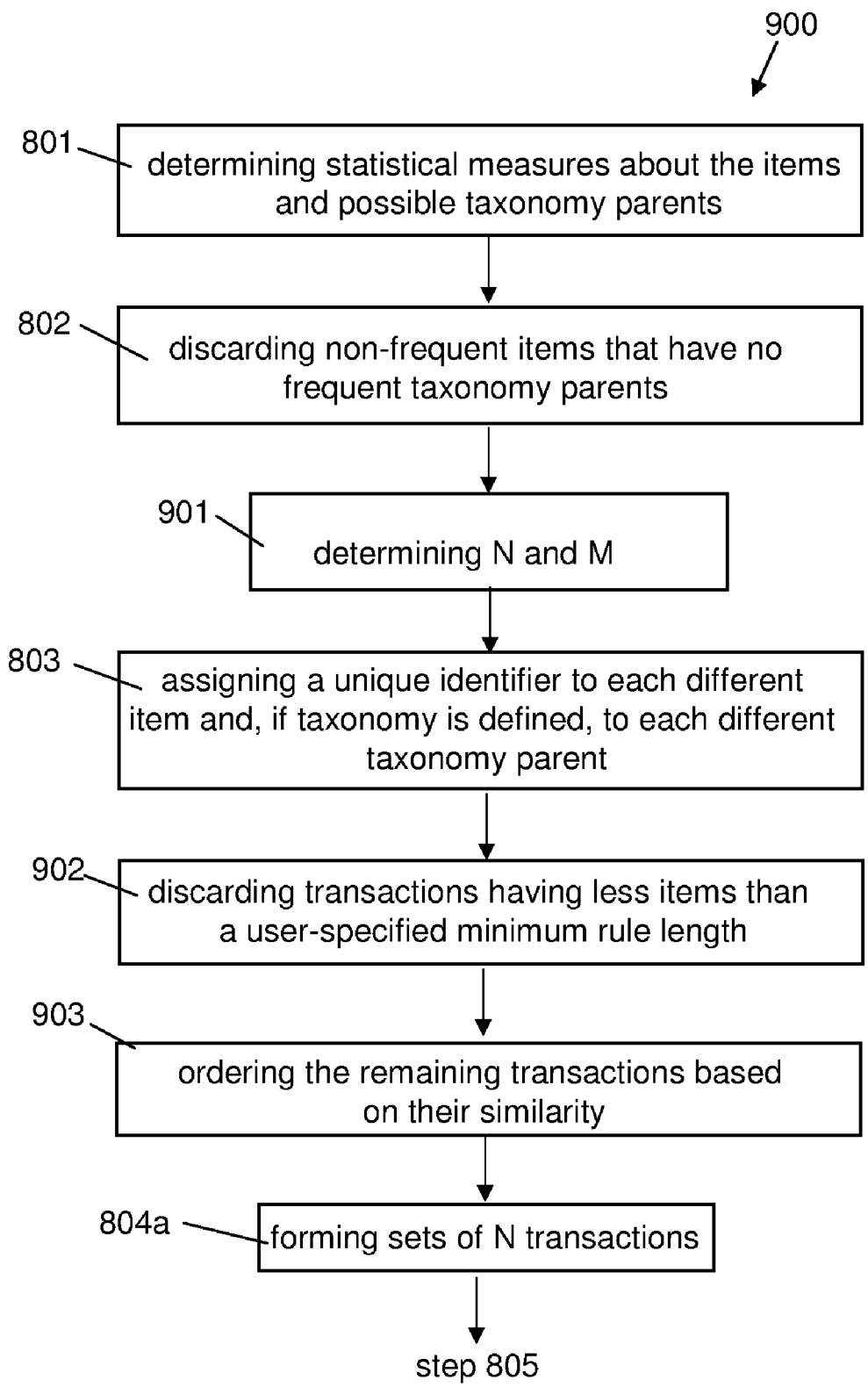
FIGS. 9a and 9b show flowcharts of further methods for compressing data comprised in a set of transactions in accordance with one embodiment of the invention.

FIG. 9a shows a flowchart of a method 900 for compressing input data into data structures in accordance with the data structure 700. This method starts with steps 801 and 802. After these steps, integer constants M and N are determined in step 901. N is dependent on computer hardware, as discussed above. Typical values for N are 32 and 64. M is the smallest suitable bit-size of an integer variable which is able to store as many different identifiers that are needed for the items in this input data. M may be, typically, 16 or 32. In step 402, all transactions which (after the discarding in step 802) have fewer items than a user-specified minimum rule length (or less than 2 items if no minimum rule length is defined) are discarded. In step 903, which is optional, the remaining transactions are ordered based on their similarity. Here similarity refers to how many same items the transactions have. This reordering improves compression efficiency. In step 804a, sets of transactions each having N transactions are formed. Thereafter the method 900 continues to step 805 to form and store data structures, which contain item identifiers as M-bit integers and typically n bit fields having N bits (n N-bit integers). If N is chosen properly, each bit field can be implemented as one single unsigned integer variable, which permits fast and efficient handling. When the data structures are formed, information about the set of transactions may be preliminary stored efficiently using an associative array (map or dictionary) with item identifier as key and the n bit fields as a values.

Figure 9B:
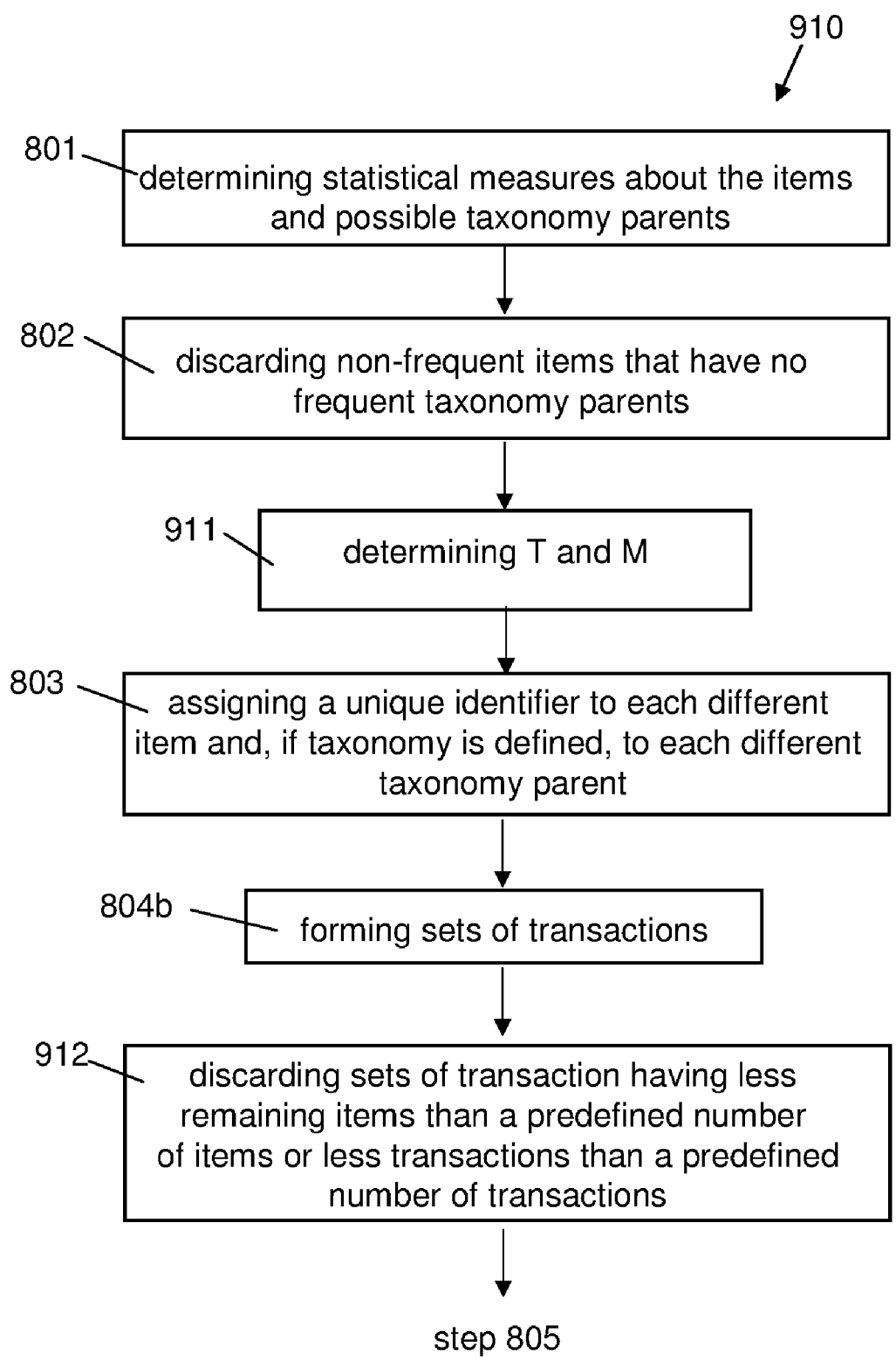

FIG. 9b shows a flowchart of a method 910 for compressing input data into data structures in accordance with the data structure 710. Also this method starts with step 801 and 802. Thereafter, integer constants T and M are determined in step 911. These constants depend on the input data characteristics. M is as defined above for method 900. T is bit-size of an integer or floating point representation of transaction identifier. Typically this transaction identifier contains the ordering information; the transaction identifier may be, for example, a time stamp. Method 910 continues thereafter with step 803. Then sets of transactions are formed in step 804b, each set of transactions represents a transaction group. A transaction group TAG is identified by the fact that each transaction within the TAG carries the same transaction group identifier. Thereafter, in an optional step, sets of transaction having less remaining items than a predefined number of items or less transactions than a predefined number of transactions are discarded. Then method 910 proceeds to step 805, to form and store data structures in accordance with the data structure 710. Typically ordering information is stored as differential information, using T-bit integers.

In the following, verification of candidate patterns with respect to compressed input data is discussed in detail. First, verification of association rules is discussed in connection with FIGS. 10a and 11. This verification of association rules uses data structures in accordance with the data structure 700. Thereafter, verification of sequential rules is discussed in connection with FIG. 12a. This verification of sequential rules uses data structures in accordance with the data structure 710. It is appreciated that if the input data contains ordered information and is compressed into a data format in accordance with the data structure 710, it is possible to ignore the ordering information in the data structure 710 and search for association rules in the compressed data.

Figure 10A:
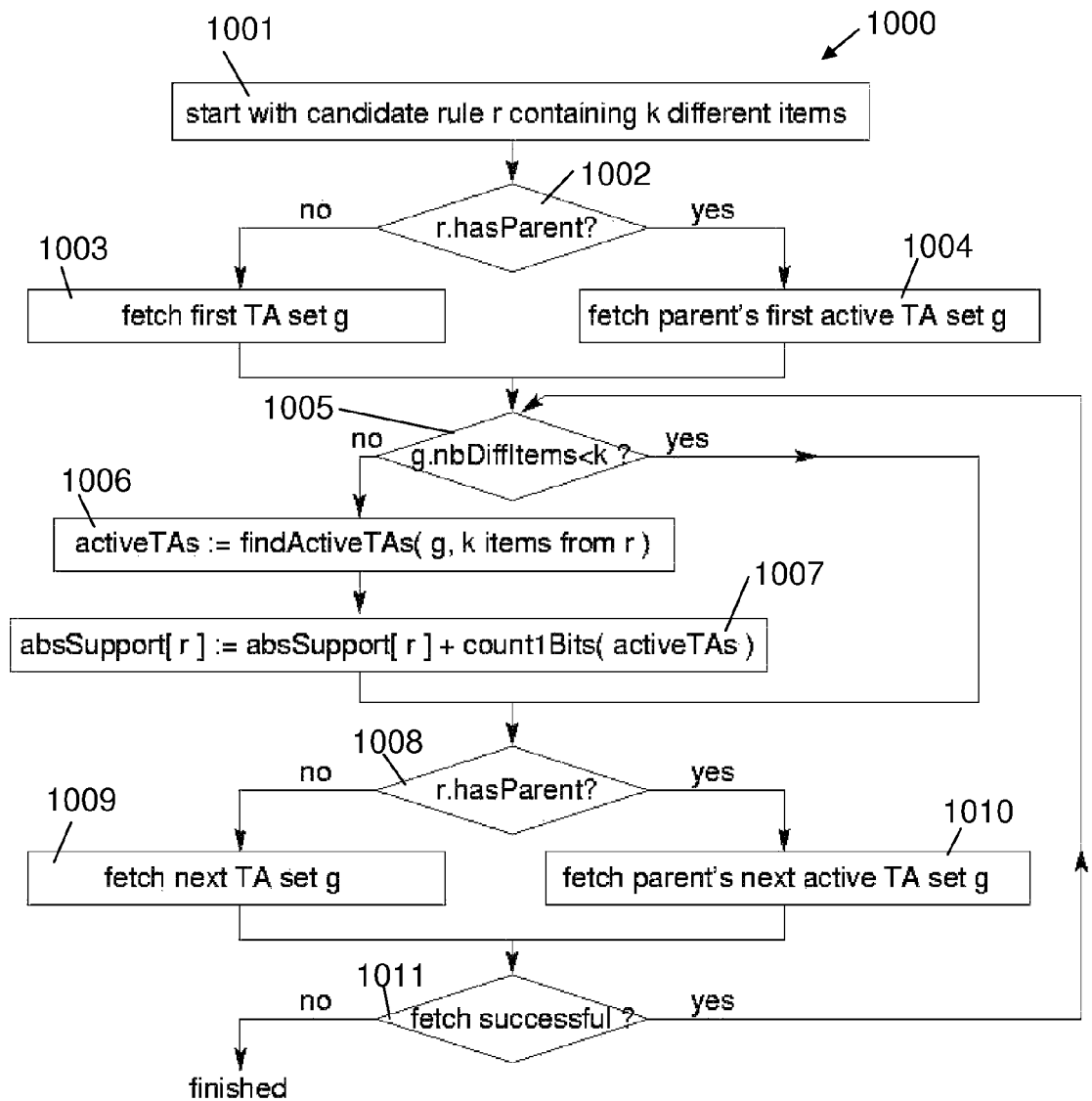

In connection with FIG. 10a, it is assumed that one given candidate pattern (that is, candidate association rule) has been composed by any pattern creation and expansion mechanism. Now this single fixed candidate pattern has to be verified against the data. In other words, those TAs in the input data need to be identified which support the candidate pattern. A TA supports a pattern if the pattern, when interpreted as an item set, is a subset of the item set consisting of all items contained in the TA. In connection with FIG. 10a, it is assumed that the candidate pattern contains a total number of k different items or taxonomy parents. It is assumed, as discussed above, that each item or taxonomy parent is represented by a unique integer ID. Furthermore, it is assumed that the n items and taxonomy parents in the TAs and in the candidate patterns are stored in an ordered way, that means sorted by increasing ID values. It is appreciated that this sorting in not mandatory, but it makes the processing of TAs and candidate patterns more efficient.

Basically, a verification algorithm has to open one TA after the other. To assess complexity of a verification algorithm, it is assumed that the current TA contains n' different items. If n' is smaller than k, the TA can not support the current candidate pattern. Therefore, assume that n' is larger than k. In this case, it is necessary to verify whether or not the candidate pattern's k items are contained in the TA's n' items. Since it is assumed that both item lists are available ordered by increasing IDs, this verification step can be performed with effort $O(\max(n', k))=O(n')$. For N consecutive TAs with on average n' different items each, the computational effort is thus $O(n'*N)$.

If, however, the N TAs are available in the form of one compressed data object as described above and as shown in FIG. 7a, the verification for all N TAs can be performed with total computational effort of $O(n)$, where n is the number of different items in all N TAs. If n grows linearly with N, that means if $n=N*n_{avg}$, than nothing is won compared to a basic verification algorithm not employing a data structure in accordance with FIG. 2a. But in fact it turns out that for typical real world data sets and item probability distributions, n grows strongly sublinearly with N, for example $n \sim \log(N) * n_{avg}$ or $n \sim N^{1/2} * n_{avg}$. Therefore, the proposed verification algorithm with computational effort $O(n)$ is strongly superior compared to the basic verification scheme.

FIG. 10a shows, as an example, a flowchart of a method 1010 where verification of association patterns is implemented in an efficient way, using the compressed data structures which were described above. The method 1010 starts in step 1001 with candidate rule r containing k different items. Steps 1002 and 1008 demonstrate that the verification scheme works well both for pattern expansion algorithms which calculate and store active-TA-information for the parent pattern of the current candidate pattern (that is, evaluation information of the parent pattern), and for expansion algorithms, such as A-Priori, which don't work with such information. In the first case, steps 1004 and 1010 will be chosen, which means that only those TA sets have to be presented and verified against the pattern, which contain at least one TA which supports the candidate's parent pattern. In the second case, steps 1003 and 1009 will be chosen, which means that all TA sets are fetched and verified against the pattern.

Step 1005 implements a computationally cheap ($O(1)$) pre-check: if a set of TAs contains less different items than the pattern to be verified against these TAs, then none of the TAs in the set can support the pattern. Step 1006 is the crucial step. The function findActiveTAs( ) takes the current TA set ('g')

and the current candidate pattern ('r'), respectively its ordered array of k items, as arguments. It returns a bit field of N bits, in which the bit at position i signals whether or not the i-th TA in g supports the pattern r. By choosing a suitable N, it is possible to implement the bit field as a single unsigned integer variable, for example, on modern 64 bit CPUs one could choose N=64.

FIG. 10b shows a pseudocode snippet which contains one possible implementation of function findActiveTAs( ). This function contains one single loop which is left after not more than n+k steps; since k is smaller than n, this is indeed $O(n)$ as claimed above.

Line (130) in the pseudocode in FIG. 10b contains the function head. It is assumed that BITFIELD_N is an unsigned integer type which has a length of at least N bits. ITEM is an integer type which is large enough to represent all different item and taxonomy parent IDs in the input data. ITEM[ ] symbolizes an array of entries of type ITEM. Line (131) initializes the bit field to be returned. At first it is assumed that every TA in the set supports the pattern. Lines (132) initialize two iterator variables which run over all items of the pattern (itemPosi_g), respectively of the TA set (itemPosi). Line (134) contains the loop frame. The condition in (134) together with the increment statements in (137) and (142) make sure that the loop ends after not more than n+k steps. The if-branch in (138) represents the case that one of the pattern's items is not found in the TA set, and then the empty bit field is returned.

The if-branch in (141) represents the case that the current pattern item has been found in the TA set. In this case, the bit field 'activeTAs' is combined by the bitwise logical 'AND' operator ('&') with the bit field indicating those TAs which contain the current pattern item.

Applying the operator '&' is a very fast operation which is executed in one CPU clock cycle on most (programming language—CPU) combinations. Then, the next item in both lists (142) is checked. If the last pattern item has been found, the function findActiveTAs can be exited and the bit field (144) can be returned. Line (146) is only reached if not all pattern items have been found in the TA set. In this case the empty bit field is returned.

Referring again to FIG. 10a, step 1007 counts all '1-bits' in the bit field 'activeTAs'. On some (programming language—CPU) combinations, there exists a special command which counts the 1-bits of an integer variable in one clock cycle. But even if such a command is not available, the counting of bits in an integer can be implemented in a very efficient way. FIG. 10c shows an example in the programming language C. The example shows how a function 'count1Bits' can be implemented which counts all 1-bits of a 64-bit integer within only 20 to 30 CPU clock cycles. The function uses an auxiliary array 'nb1Bits' which has a size of 256 bytes.

In step 1011 it is checked whether it was possible to fetch a further TA set with respect to which the candidate rule is to be evaluated. If there are no more TA sets to be fetched, the evaluation of the candidate pattern is finished. Evaluation information of the candidate rule with respect to the input data is stored in variable activeTAs. The next candidate pattern can thereafter be evaluated using the same method. After each pattern evaluation, the pattern is added to the list of the result patterns if it passes all filter constraints. Data mining is complete when all candidate patterns have been evaluated. The output is a list of all patterns which passed all filter criteria (that is, a list of result patterns).

Some pattern creation and pattern expansion algorithms create large sets of similar candidate patterns, which typically share k−1 common items and differ only in one added item.

Alternatively, patterns generated with any algorithm may be ordered into this kind of sets of similar candidate patterns for verification. The verification scheme described in connection with FIG. 10a can be adapted in order to further reduce the verification effort.

If the compressed input data structure contains also weight information, the step 1007 in FIG. 10a contains further actions relating to the weight storage units. The actions are typically the following:

```
bodyWeightStats[r]:=bodyWeightStats[r]+getBody-
    Weights(activeTAs)

headWeightStats[r]:=headWeightStats[r]+getHead-
    Weights(activeTAs)

TAWeightStats[r]:=TAWeightStats[r]+getTAWeights
    (activeTAs)
```

Similar calculations may be used for transaction groups with weighting information.

Figure 11:
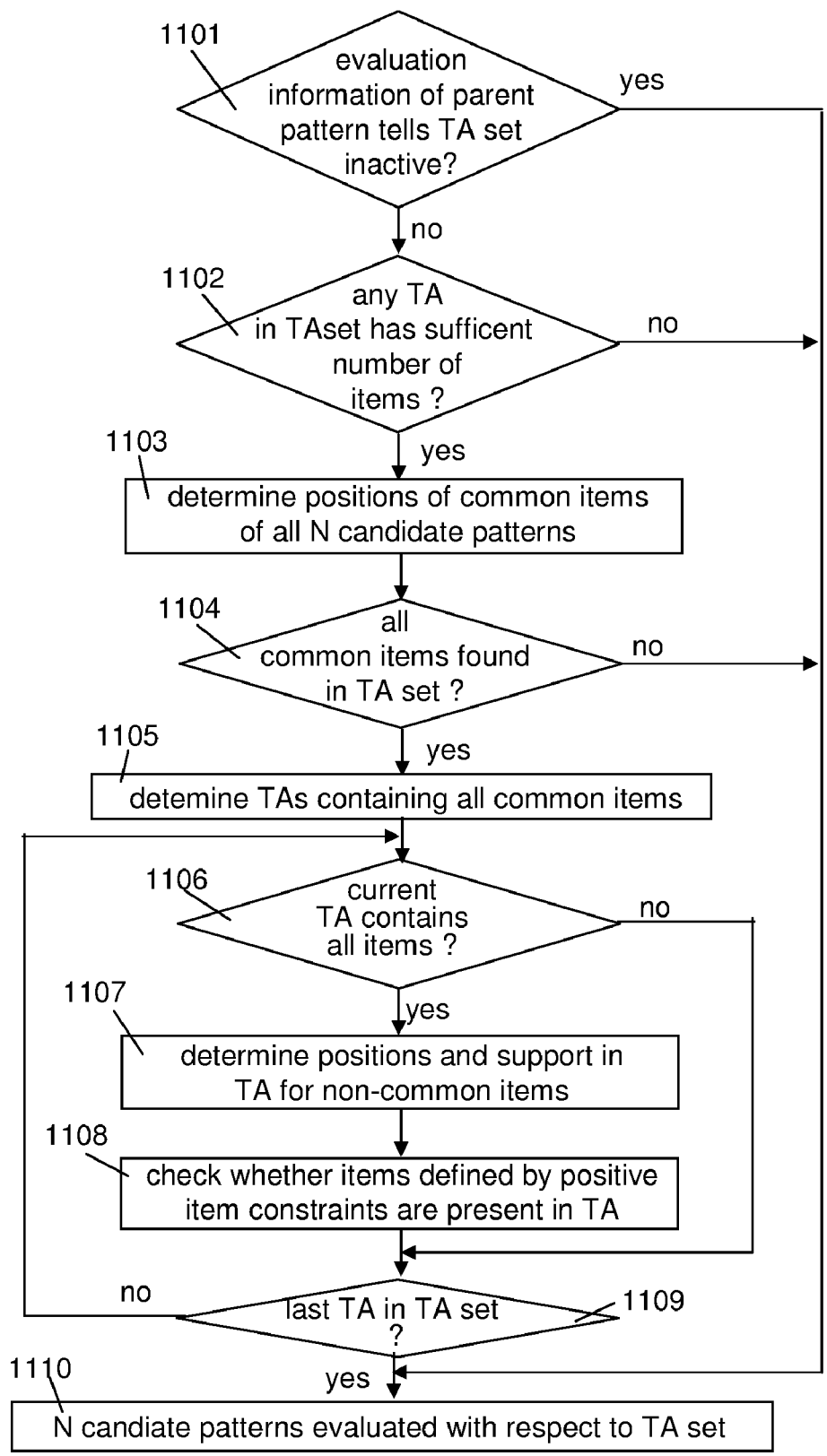
FIG. 11 shows a flowchart of a method for verifying association rules in sets of similar rules with respect to compressed input data in accordance with one embodiment of the invention.

FIG. 11 shows, as an example, a flowchart of a method 1100 in accordance with the modified verification scheme, which can be summarized as follows. For all TA set data objects (that is, for data structures 700), the current object is skipped if an active TA set history shows that this set is inactive (step 1101 in FIG. 11). The current object is skipped, if none of its TAs contains enough items to satisfy the current minimum rule length criterion (which might have been restricted during the rule creation and verification process); step 1102 in FIG. 11. Thereafter, positions of the common items of all candidates are determined in the TA set (step 1103 of FIG. 11). If all of these items are found (step 1104), those TAs within the set are determined which contain all these common items (step 1105). This can be done by fast bit-wise OR operations on the item-in-TA bit fields. If the resulting list of TAs containing all common items of the set of candidate patterns is non-empty (steps 1106, 1109), those TAs are determined which also support the non-common items of each candidate pattern (step 1107). Step 1108 is an optional step relating to positive item constraints; this step is discussed in more detail below. After all TAs containing all common items have been processed, the set of N similar candidate patterns has been evaluated with respect to the TA set (step 1110). It is appreciated that by discarding steps 1103-1105 and 1107 in FIG. 11, the result is a general level description of the more detailed flowchart in FIG. 10a.

Figure 12A:
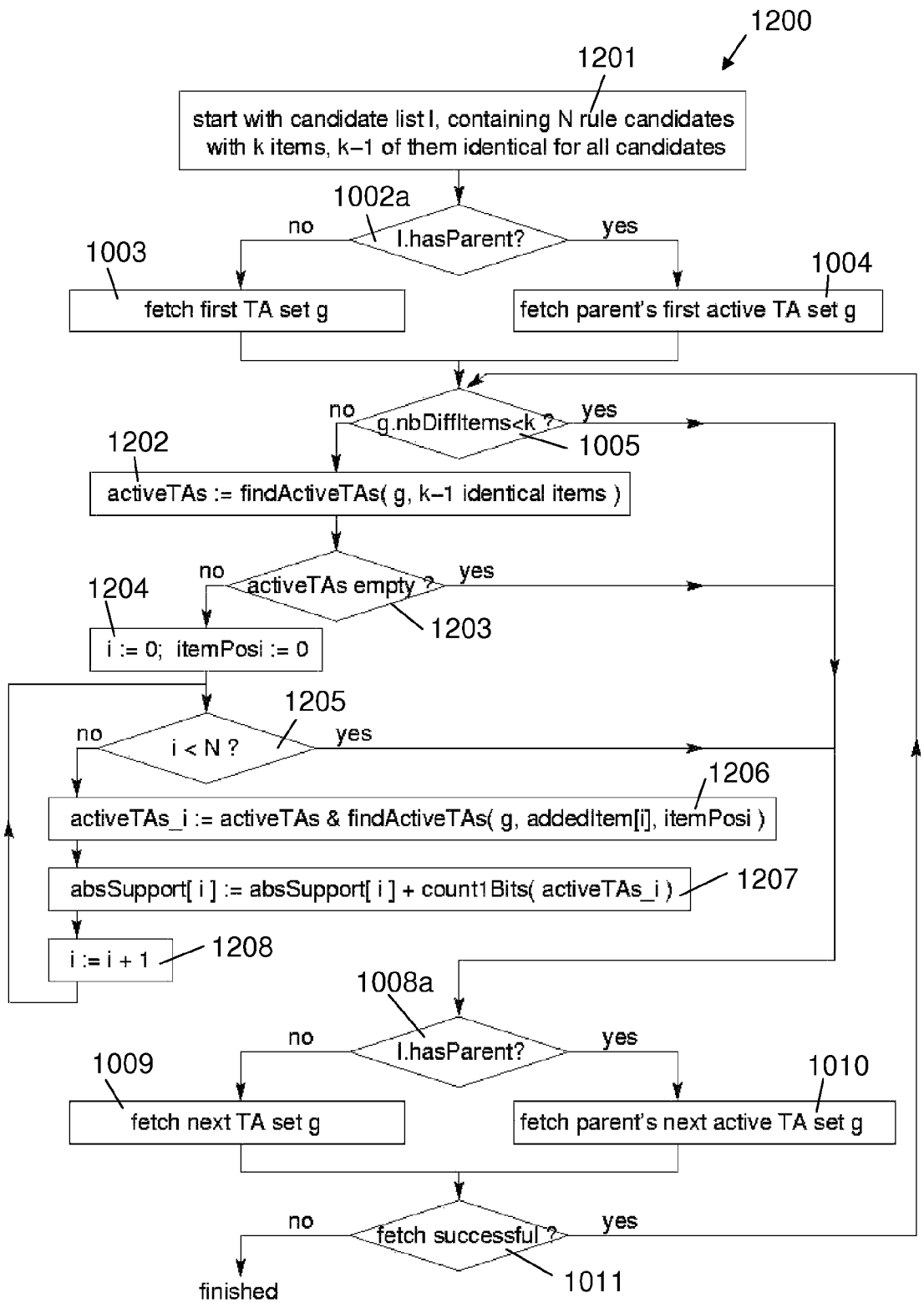

FIG. 12a shows a more detailed picture of this verification scheme of a set of similar candidate items. The method 1200 starts in step 1201 with a candidate list 1 containing N rule candidates with k items, Of these k items, k−1 are identical for all candidates. Similarly as the method 1000, the method 1200 may employ evaluation information of the parent rule (steps 1002a, 1003, 1004, 1008a, 1009 and 1010). When comparing the flowchart of method 1200 to the flowchart of method 1000, one finds that the method 1200 contains an additional loop (steps 1204, 1205, 1206, 1207 and 1208). This loop runs over all N candidates 'i' of the current set of pattern candidates to be verified. The additional benefit if the modified method 1200 lies in the fact that the largest part of the item verification can be pulled out of the loop over all candidates (step 1202). That means, k−1 out of k items only have to be verified once for all N candidates, and only the single item which differs among different candidates has to be verified for each candidate separately (step 1206).

FIG. 12b lists the pseudocode for a possible implementation of the function 'findActiveTAs' in step 1202. This implementation is almost identical to the implementation of the corresponding step 1006 in the verification scheme shown in FIG. 10a.

The function 'findActiveTAs' in step 1202 has a different signature and needs a different implementation. This function only checks for the existence of one single given item in the TAs of the current TA set. In step 1203, it is checked whether any active TAs were found. A possible implementation of the function "findActiveTAs" is shown in FIG. 12c.

Note that the third function argument in FIG. 12c, 'itemPosi' is an in-out parameter. When the function is entered, parameter 'itemPosi' indicates the item position within the array of all different items if the TA group g at which the search for the item 'itemID' shall start. At the end of the function, 'itemPosi' points to the position at which item 'itemID' was found. This position, increased by one, is a good starting point for searching when the function 'findActiveTAs' is called the next time, that time with an itemID which is larger than the itemID of the previous call. That means, the different pattern candidates which are traversed by the loop of steps 1204 to 1208 in the flow chart, must be sorted, for this implementation, by increasing itemID of the added item which varies among the candidates.

In the following, a further refinement of the evaluation of association rules is discussed. It is appreciated that this refinement is applicable both to association and sequence rules and also both to evaluating single candidate patterns and a set of similar candidate patterns at a go. It is possible that a user has defined item constraints, that is the user has specified interest in only those rules which do/do not contain certain items or item categories (=taxonomy parents). The first case is here called a 'positive item constraint', the second case a 'negative item constraint'.

Regarding negative item constraints, the following can be noted. If the constraint is 'item X must not appear in the rule', it is possible to ignore item X whenever it is found in the original input data. So this kind of negative item constraint can be taken into account already when original input data is preprocessed and compressed into binary format. If the constraint is 'item X must not appear in the rule head/in the rule body, then the rule candidate creation algorithm, which is not part of this discussion, has to deal with that constraint Regarding positive item constraints, the following can be noted. Typically candidate rule creation schemes adopt a step-by-step approach: they start from simple rules item1→item2 and then stepwise construct more complex rules by repeatedly adding one item to either rule body or rule head. If positive item constraints are present, this results in three possible results when verifying a given candidate rule. Firstly, the candidate rule can be found inactive (e.g. if it is infrequent). Secondly, the candidate rule can be found active (e.g. if it is frequent and contains all required items at the correct position). Thirdly, the candidate rule is inactive but extensible (e.g. if it is frequent, a required item is missing, but an extended candidate which contains the missing item might be active).

The storage schema and verification process described here in connection with FIGS. 10a through 14 provides an efficient way of taking into account these positive item constraints. An example is given in FIG. 11, where step 1108 relates to taking into account the positive item constraints. In this step 1108 for each item that appears in a positive item constraint, those TAs which not only support the currently evaluated candidate pattern but also contain the item in the positive item constraint are counted. At the end of the verification pass, this refinement helps to sort out some of the candidate patterns that would otherwise have been classified as 'inactive but extensible': one can throw away all extensible candidates for which no valid combination of items occurring in positive constraints is frequent. This is an important improvement because restricting the candidate search space is essential to reduce run times.

Next the verification of sequence rules with respect to compressed input data is discussed. It is appreciated that FIG. 11 provides a general view also on this scheme (evaluating either one or more than one candidate patterns at a go). The relevant modification is that for sequence rules, step 1107 further contains a check of whether the items in a TA occur in the order defined by the sequence rule.

Time information is used here as an example of ordering information. First, it is assumed that one given candidate pattern (that is, a candidate sequence rule) has been composed by a pattern creation and expansion mechanism. It is assumed that this pattern consists of m item sets, in other words it contains m different time stamps and hence m−1 time steps. Now this single fixed candidate pattern has to be verified against the data. That means it is necessary to identify those TAGs in the input data which support the candidate pattern. A TAG supports a pattern if there is a subset $\{TA_1, \ldots, TA_m\}$ of TAs of the TAG such that For i=1 . . . m, the $TA_i$ are ordered by increasing time stamp For i=1 . . . m, $TA_i$, interpreted as an item set, is a superset of the pattern's i-th item set.

Figure 13A:
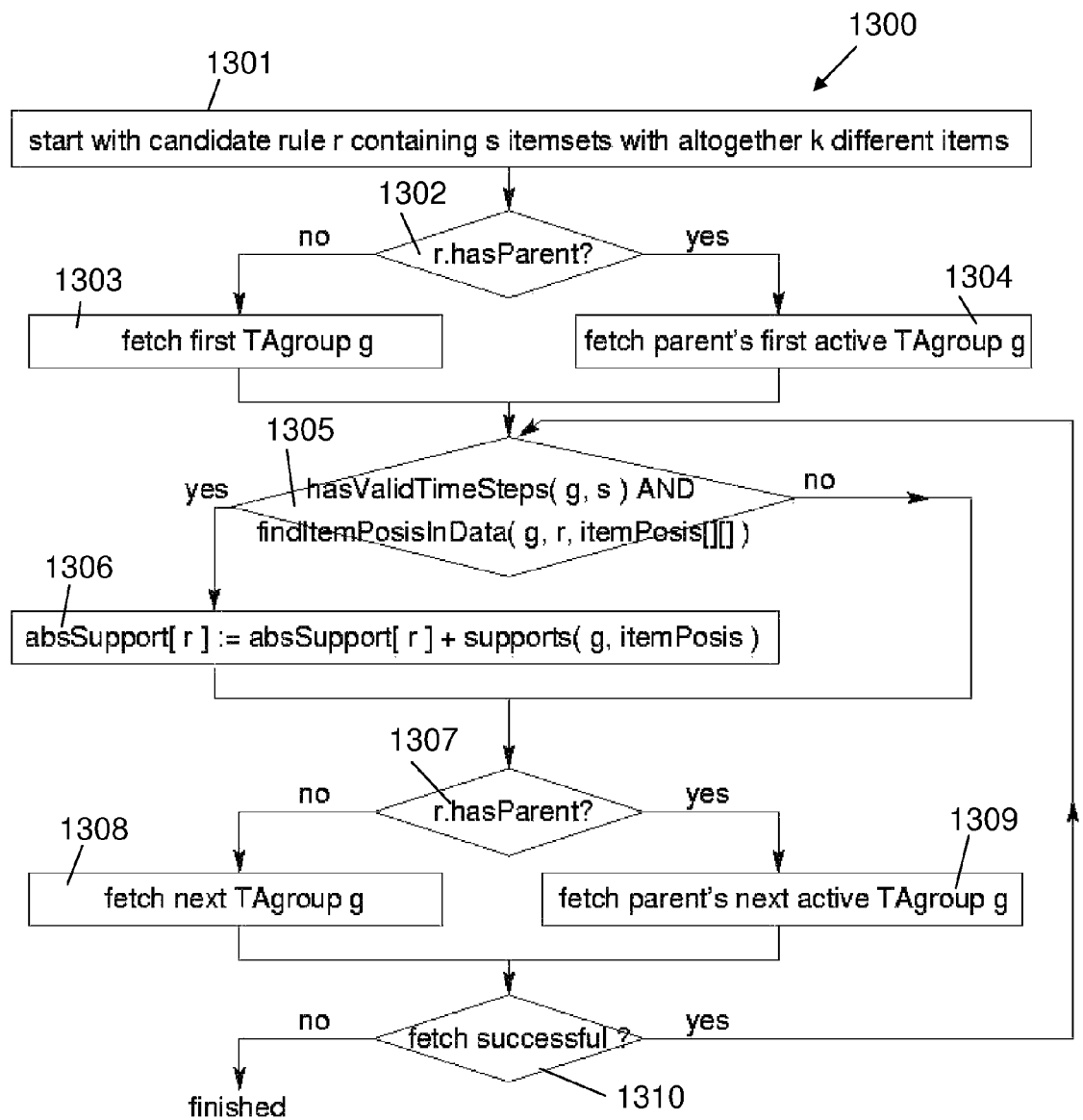

FIG. 13a shows, as an example, a flowchart of a method 1300 where pattern verification is implemented in an efficient way, using the compressed data structures which were described above. The flowchart in FIG. 13a assumes that the candidate pattern contains s item sets with a total number of k different items or taxonomy parents (step 1301). It is assumed that each item or taxonomy parent is represented by a unique integer ID; furthermore, it is assumed that the k items and taxonomy parents are accessible in an ordered way, that is, sorted by increasing ID values. This ordering increases efficiency of implementation, but is not mandatory.

Basically, a verification algorithm now has to open one TAG after the other. Steps 1302 and 1307 of the flowchart demonstrate that the verification scheme works well both for pattern expansion algorithms which calculate and store active-TAG-information for the parent pattern of the current candidate pattern, and for expansion algorithms such as A-Priori which do not work with such information. In the first case, steps 1304 and 1309 will be chosen, which means that only those TAGs have to be presented and verified against the pattern which supports the candidate's parent pattern. In the second case, steps 1303 and 1308 will be chosen, which means that all TAGs are fetched and verified against the pattern.

Assume that the current TAG contains n different items. If n is smaller than k, the TAG can not support the current candidate. Therefore, assume that n is larger than k.

Step 1305 checks whether the distribution of TAs and their time stamps in the TAG is such that a valid series of s item sets can be supported. If no specific constraints on allowed time steps in a sequence exist, this check is trivial and has computational complexity O(1): it only must be checked that the number of TAs in the TAG is not smaller than s. If specific constraints have to be respected, for example that each valid time step must be above a certain minimum value or below a certain maximum value, then this check can become more complex.

The further check in step 1305 serves two purposes. First, it is a second pre-check which sorts out certain TAGs which cannot support the candidate. The function findItemPosisInData( ) checks whether all different items in the candidate pattern appear in the TAG. That means, it is necessary to verify whether or not the candidate's k items are contained in the TAG's n items. Since it is assumed that both item lists are available ordered by increasing IDs, this verification step can be performed with effort O(max(n,k))=O(k).

If that pre-check fails, function findItemPosisInData( ) immediately returns FALSE, otherwise, the functions continues and serves a second purpose. This second purpose of the second check in step 1305 is to create a representation of the candidate pattern which contains all item sets of the pattern, each item set being represented as an array of items (and taxonomy parents). However, for easy matching against the current TAG, it is useful to represent each item or taxonomy parent not by its ID but by its position in the list of different items of the TAG. The third function argument, 'itemPosis' returns this information in the form of a two-dimensional array, the first array dimension runs over all item sets of the candidate pattern, the second array dimension runs over all items in the current item set.

FIG. 13b shows a pseudocode which contains one possible implementation of function findItemPosisInData( ). The overall computational complexity of this function is O(n+k)=O(n).

Line (130) in the pseudocode in FIG. 13b contains the function head. It is assumed that the TAG is available in the form of a structured object of type TAGROUP which offers the method 'itemID(index)'. This method is assumed to return all different item and taxonomy parent IDs which occur in the TAG, ordered by increasing ID. Furthermore, it is assumed that the candidate pattern is available in the form of a structured object of type CANDIDATERULE which offers the following methods:

itemID(itemIndex) returns all item and taxonomy parent IDs which occur in the candidate pattern, ordered by increasing ID when index runs from 0 to k−1.

numberOfDifferentItems( ) returns the value k of different items and taxonomy parents in the pattern.

numberofItemsets( ) returns the value s of item sets in the pattern.

numberOfItems(itemsetIndex) returns the number of different items in the itemset at position 'itemsetIndex'.

itemPosi(itemsetIndex,i) returns the itemIndex (=position) which has to be put into function itemID(itemIndex) in order to obtain the ID of the i-th item or taxonomy parent within the item set at position 'itemsetIndex'.

Lines (131) initialize two iterator variables which run over all items of the candidate rule (itemPosi_r), respectively of the TAG (itemPosi_g). Line (133) initializes an integer array of length n. For each different item which occurs in the candidate pattern, this array will contain the position of this item in the TAG. The loop from line (134) to line (142) compares the candidate's items with the TAG's items and fills the array 'mapItemPosis_r_to_g' with the correct values. Lines (138) and (144) are reached if one of the candidate's items is not found in the TAG. In this case, the function immediately returns FALSE. Line (145) is only reached if all of the candidate's items have been found in the TAG. In this case the function starts part2 of its duty and fills the return parameter 'itemPosis' with the correct values, namely for each item set of the candidate pattern the positions in the TAG of all items which form the item set.

This ends the discussion of function findItemPosisInData. Now, returning to the flowchart in FIG. 13a. In step 1306, a function 'supports( )' is called. This function performs the core of the verification: it checks whether the current TAG supports the candidate pattern. If this is the case, the function returns 1, otherwise it returns 0. FIG. 13c shows a pseudocode containing a possible implementation of function 'supports( )'. The effort is O(n).

Line (150) in FIG. 13c contains the function head. It is assumed that the TAG is given in the form of a structured object of type TAGROUP which provides the following methods:

numberOfTAsInGroup( ) returns the total number of TAs (number of different time stamp values) in the TAG.

itemID(itemIndex) returns the n different item and taxonomy parent IDs which occur in the TAG.

bitField(itemIndex) returns the bit field of active TAs for each different item or taxonomy parent which occurs in the TAG. In other words, the i-th bit of bitField(itemIndex) indicates whether or not the item with ID itemID (itemIndex) occurs in the i-th TA of the TAG.

Lines (151) to (154) initialize a few local variables. Line (151) stores the number of TAs in the TAG. Line (152) defines an iterator variable which runs over all item sets of the candidate. Line (153) defines a variable which indicates the start TA position within the TAG at which the matching of the next candidate item set should start. Line (154) defines a bit field variable which will be used to represent all TAs which are supersets of a given item set.

Line (155) starts the loop over all item sets of the candidate, which are one after the other matched against the TAs of the TAG. Line (156) initializes the bit field of possibly active TAs for the current item set. All bits from 0 to the TA position at which the previous item set was found are set to zero because these TAs need not be inspected for matching the current item set. The loop in (157) and (158) superposes the active-TA bit fields of all items of the current item set by the bitwise logical 'AND' operator (&). Hence, after the loop, the bit fields' activeTAs contains all TAs—with time stamps higher than the time stamp of the TA which matched the previous item set—which contain all items of the current item set. If this bit field is empty, line (159) leads to exiting the function with return value 0; in this case, the TAG does not support the candidate pattern. Otherwise, the loop over all candidate item sets is continued after having memorized the TA position at which the current item set has been matched.

Some pattern creation and pattern expansion algorithms create large sets of similar candidate patterns, which typically share k−1 common items and differ only in one added item. Alternatively, it is possible that candidate patterns generated using any method are organized to sets of similar candidate patterns. The verification scheme described in connection with FIG. 13a can be adapted in order to further reduce the verification effort.

An example of a modified verification scheme can be summarized as follows:

skip the current TAG if it does not contain enough items or item sets to satisfy the current minimum sequence length criteria skip the current TAG if it does not have enough valid time steps between its item sets for forming a sequence which passes all elapsed time restrictions defined by the mining user.

make sure all common items of all candidates are contained in the TAG. Skip the TAG if a common item is missing, otherwise memorize the common items' positions in the TAG.

determine those candidates for which also the candidates' specific extra items are contained in the TAG, deactivate the other candidates.

if there are remaining active candidates: find a combination of TAs which contain the common part of all candidates (=the common item sets in the correct time order). Skip this TAG if no such combination of TAs is found.

for each remaining active candidate: starting from the combination of TAs identified in the previous step, find a combination of TAs which also contains the candidate's specific modified item set(s) in the correct time order with respect to the candidate's other item sets.

One optional feature in pattern evaluation methods is dynamic memory management. This is discussed next with reference to FIG. 14. The dynamic memory management typically consists of two complementary parts: the memory manager instance 1400 and the managed objects 1410, which have some common properties and capabilities to match with the memory manager's requirements. In an object oriented approach, the dynamic memory management can be implemented by one class instance of class type 'MemoryManager' and by deriving all object instances to be controlled by the memory manager from a common base class 'MemoryManagedObject'. In the following, dynamic memory management is discussed with reference to the object oriented approach, but it is evident that similar features and functionalities can be implemented also using other approaches.

A memory manager 1400 has a fixed storage capacity, and it typically provides at least the following methods. Method getCapacity( ), which is shown schematically with block 1401 in FIG. 14, returns the total capacity of the memory manager 1400 (for example, in bytes). Block 1402 represents a method called getOccupiedSize( ) which returns the amount of used (=Occupied) memory in the memory manager 1400 (for example, in bytes). Block 1403 represents a method called addObject(MemoryManagedObject), which adds a new object 1410 to the memory manager 1400. If after adding the new object the memory manager's capacity would be exceeded, the memory manager 1400 automatically dumps enough of its stored objects to a predefined workspace on disk before adding the new object. The memory manager 1400 keeps only that information about the dumped objects in memory which is needed for reloading the dumped object when the dumped object has to be accessed again. Block 1404 represents a method called removeObject(MemoryManagedObject), which deletes one managed object from the memory manager 1400.

A memory managed object 1410 has typically at least the following properties and methods. Block 1411 represents a method getMemorySize( ), which returns the objects total memory size (for example, in bytes). Block 1412 represents a method lockForReading( ) which marks the object as 'currently being accessed in read-only mode'. A read-locked object can not remain dumped to disk: if it has been dumped to disk before, it will be automatically be reloaded into memory by the dynamic memory management. Block 1413 represents a method lockForWriting( ) which marks the object as 'currently being accessed and modified'. A write-locked object can not remain dumped to disk: if it has been dumped to disk before, it will be automatically be reloaded into memory. An existing dump of the object will be removed from disk, because the object is being changed and the dump is not up to date any more. Block 1414 represents a method getState( ) which indicates whether the model is currently being accessed for reading or writing, or whether or not is has been dumped to disk. Block 1415 represents a method dumpToDisk( ) which writes most parts of the object to disk, keeping only that information in memory which is needed to later refetch the object from disk. Block 1416 represents a method refetchFromDisk( ) which restores an object which has been dumped to disk before, so that the object now entirely resides in memory.

When the concept of MemoryManager and MemoryManagedObject is used in a specific implementation of a specific algorithm, in principal each data structure used by the algorithm can be made a MemoryManagedObject. The properties and methods of a MemoryManagedObject can just be wrapped around or combined with the specific properties or methods of the data structure. For every data structure used in the algorithm, one has to decide whether the data structure is big enough (and whether its life time is long enough to justify the overhead of treating it as a MemoryManagedObject. Sometimes, one could decide not to treat single data structures as MemoryManagedObjects, but instead treat entire sets or arrays of such data structures as MemoryManagedObjects. For example, when storing the TAs or TAGs of the input data for a data mining problem, one could decide not to make each single TA or TAG data structure a memory managed object, but for example an array of 10000 or 100000 consecutive such data structures.

Figure 14:
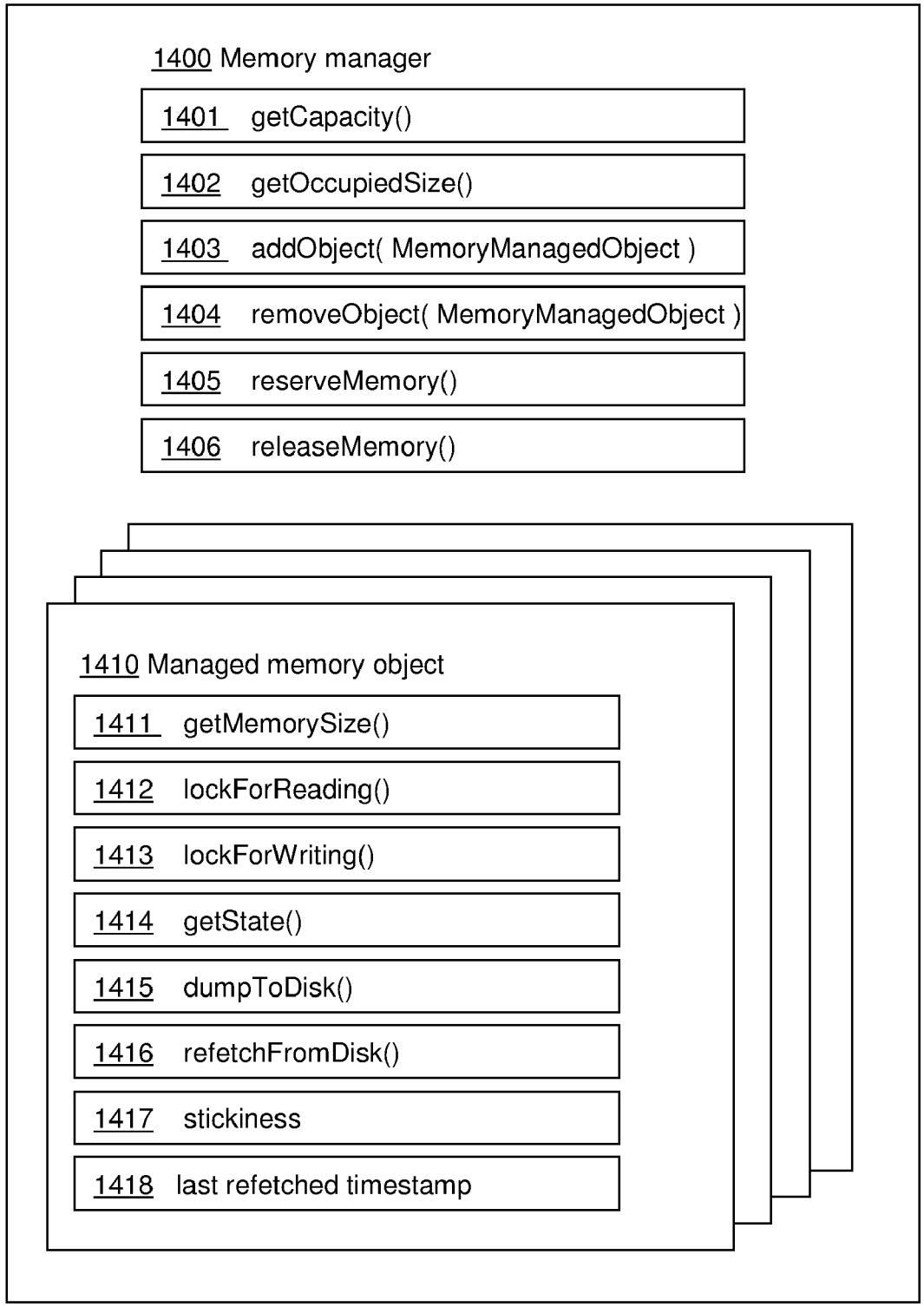
FIG. 14 shows schematically dynamical memory management applicable to data mining applications in accordance with one embodiment of the invention.

As a first refinement, the memory manager 1400 may contain some objects which are relatively small but which are used frequently. On the other side, there may be large objects which are not needed during long parts of the mining algorithm run time. When the memory manager 1400 needs to dump parts of its content to disk, the second class of objects (that is, the large objects needed rarely) should be dumped preferably to disk. This goal can be attained by attributing a 'stickiness' value to each object in the memory manager 1400. The stickiness, which is illustrated in FIG. 14 with a block 1417, may have, for example, three values: 'alwaysInMemory', 'preferablyInMemory', 'preferablyOnDisk'. In this example, the first class of objects ('alwaysInMemory') will never be dumped to disk, objects from the second class ('preferablyInMemory') will only be dumped if no more undumped object of the third class ("referablyOnDisk") exists in the memory manager.

A further refinement of the dynamic memory management is to use 'last refetched' timestamps (block 1418 in FIG. 14) to prioritize objects 1410 in the memory manager 1400. This second refinement is orthogonal to the first refinement: these two refinements can be used together or separately. In order to introduce this idea, consider the following example. There are n similar objects (e.g. data pages) in the memory manager which have to be accessed frequently during a certain phase of the data mining run. Furthermore, the memory manager 1400 contains m other objects which are not needed currently. The memory manager's capacity is sufficient to store n−1 of the n frequently accessed objects simultaneously. Depending on the memory manager's dumping strategy, it is possible to end up in a situation in which each time when one of the n objects is needed, it must be refetched from disk. On the contrary, the best achievable situation is that all of the m objects and only 2 of the n objects are dumped to disk, and n−2 out of the n frequently used objects permanently remain in RAM. Assume that $T_0$ is the time at which the current phase of the data mining run started, and that each object in the memory manager 1400 carries a time stamp T which contains the last refetch time, that is the latest time when the object was fetched from disk to memory. Then the following dump/refetch heuristics attains the 'best achievable situation' described above: If an object is to be dumped, the memory manager 1400 dumps preferably those objects with $T<T_0$ (these are the m other objects described above). Among the objects with $T>T_0$, the object with largest T is dumped first to disk. The reference to current phase can be understood as a period of time in which the computer program does similar things again and again and frequently uses a certain fixed subset of all the available data structures, whereas other data structures are almost never used during this time.

As a third refinement it is possible to track memory consumption for additional lightweight objects. Examples for those lightweight objects are auxiliary variables, arrays or other data objects. Each of these lightweight objects is too small (or there are too many of them) to justify the overhead (in memory and execution time) of providing each of them with the properties of a MemoryManagedObject. But if the sum over all the memory owned by all these objects at certain point of the algorithm's control flow can reach a considerable amount of the total available memory, then that memory consumption should also be tracked in order to have the memory manager to work accurately. The memory manager 1400 can additionally track the amount of memory consumed by 'lightweight' objects which do not derive from MemoryManagedObject. For this purpose, the memory manager needs at least the following methods: reserveMemory( ) and releaseMemory( ). These are represented by blocks 1405 and 1406, respectively, in FIG. 14. The lightweight objects, however, cannot be dumped to disk to create space for new objects in the memory manager 1400.

It is appreciated that the dynamic memory management discussed above is applicable to any data mining approach evaluating candidate patterns with respect to input data.

It is further appreciated that input data to a method for evaluating pattern candidates may be provided as raw input data. In this case, the method for evaluating candidate patterns may contain any necessary steps of compressing the raw input data into a compressed format. Alternatively, a method for evaluating candidate patterns may simply have access to compressed input data.

This description explicitly describes some combinations of the various features discussed herein. It is appreciated that various other combinations are evident to a skilled person studying this description.

In the appended claims a computer-implemented method refers to a method whose steps are performed by a computing system containing a suitable combination of one or more processors, memory means and storage means.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer-implemented method for compressing data included in a set of transactions, each transaction having at least one item, said method comprising:
assigning a unique identifier to each different item and, when taxonomy is defined, to each different taxonomy parent,
forming subsets of transactions from the set of transactions, wherein each subset includes at least two transactions, and
storing said subsets of transactions using a computer data structure including:
a list of identifiers of different items in the subsets of transactions,
information indicating number of identifiers in the list, and
bit field information indicating presence of the different items in the subsets of transactions, said bit field information being organized in accordance with the list for facilitating evaluation of patterns with respect to the subsets of transactions,
wherein said stored subsets of transactions in the computer data structure collectively form a compressed set of data relative to the data included in the original set of transactions.

2. The method of claim 1, wherein said list of identifiers further comprises identifiers of different taxonomy parents of the different items, and said bit field information indicates presence of the different items and of the different taxonomy parents in the set of transactions.

3. The method of claim 1, wherein said bit field information further comprises one bit for each item—transaction pair, the size of the bit field being the number of identifiers times number of transactions in the subset.

4. The method of claim 1 wherein the computer data structure further comprises at least one of the following: weight statistics associated with said different items, and accumulated weight statistics associated with said subsets of transactions.

5. The method of claim 1, further comprising:
determining item frequencies and, when taxonomy is defined, taxonomy parent frequencies before assigning said unique identifiers, and
discarding items having item frequency and, when present, taxonomy parent frequency less than a predefined frequency, thereby producing remaining items and remaining transactions,
wherein said unique identifiers are assigned to each different remaining item and to each different remaining possible taxonomy parent.

6. The method of claim 1, further comprising ordering items and identifiers in said data structures in accordance with said identifiers.

7. The method of claim 1, wherein each subset of transactions contains a predetermined number of transactions, said predetermined number being dependent on hardware.

8. The method of claim 1, wherein each subset of transactions represents a transaction group, identified by each transaction within the group carrying a same transaction group identifier, each transaction having ordering information and said computer data structures further comprising information indicating number of transactions in the transaction group, and information about the ordering information of the different transactions.

9. The method of claim 7, further comprising discarding transactions having less remaining items than a predefined number before forming said subsets of transactions.

10. The method of claim 7, further comprising ordering said remaining transactions based on similarity thereof before said step of forming subsets.

11. The method of claim 8, wherein said information about the ordering information indicates differences between transactions.

12. The method of claim 8 wherein the computer data structure further comprises information indicating the total number of items in each subset of transactions.

13. The method of claim 8, further comprising discarding subsets of transaction having less remaining items than a predefined number of items or less transactions than a predefined number of transactions.

14. A computer-implemented method for detecting patterns in input data containing a set of transactions, each transaction having at least one item and items possibly having taxonomy parents, the set of transactions being partitioned into subsets, the method comprising:
providing input data in computer data structures having
a list of identifiers of different items in the subsets of transactions,
information indicating number of identifiers in the list, and
bit field information indicating presence of the different items in the subsets of transactions, each subset including at least two transactions, said bit field information being organized in accordance with the list for facilitating evaluation of patterns with respect to the subsets of transactions; and
evaluating a candidate pattern using bit map operations on the bit field information of the computer data structures.

15. The method of claim 14, wherein said step of providing input data contains at least one of the following: reading said data structures from a storage medium; and processing input data to form said data structures.

16. The method of claim 14, further comprising taking into account evaluation information of a parent candidate pattern of said candidate pattern when evaluating said candidate pattern.

17. The method of claim 14, further comprising determining whether items defined by positive item constraints are present in transactions in connection with evaluating the candidate pattern.

18. The method of claim 14, further comprising evaluating a subset of similar candidate patterns, said subset containing at least two candidate patterns, together with respect to the computer data structures.

19. The method of claim 14, further comprising determining whether items occur in a same order in the candidate pattern and in transactions of said computer data structures.

20. The method of claim 16, wherein said evaluation information of said parent candidate pattern is taken into account by evaluating said candidate pattern only with respect to transactions supporting said parent candidate pattern.

21. The method of claim 18, further comprising determining presence of common items of the subset of similar candidate patterns in said computer data structures, and determining presence of non-common items of the subset of similar candidate patterns in transactions of said computer data structures having said common items.

22. A computer program product comprising a non-transitory computer useable medium including a computer readable program, for compressing data included in a set of transactions, each transaction having at least one item, wherein the computer readable program when executed on a computer causes the computer to:
assign a unique identifier to each different item and, when taxonomy is defined, to each different taxonomy parent,
form subsets of transactions from the set of transactions, wherein each subset includes at least two transactions, and
store said subsets of transactions using a computer data structure including:
a list of identifiers of different items in the subsets of transactions,
information indicating number of identifiers in the list, and
bit field information indicating presence of the different items in the subsets of transactions, said bit field information being organized in accordance with the list for facilitating evaluation of patterns with respect to the subsets of transactions,
wherein said stored subsets of transactions in the computer data structure collectively form a compressed set of data relative to the data included in the original set of transactions.

23. The computer program product of claim 22, further causing the computer to:
determine item frequencies and, when taxonomy is defined, taxonomy parent frequencies before assigning said unique identifiers, and
discard items having item frequency and, when present, taxonomy parent frequency less than a predefined frequency, thereby producing remaining items and remaining transactions,
wherein said unique identifiers are assigned to each different remaining item and to each different remaining possible taxonomy parent.

24. The computer program product of claim 22, further causing the computer to order items and identifiers in said data structures in accordance with said identifiers.

25. The computer program product of claim 22, wherein each subset of transactions contains a predetermined number of transactions, said predetermined number being dependent on hardware.

26. The computer program product of claim 22, wherein each subset of transactions represents a transaction group, identified by each transaction within the group carrying a same transaction group identifier, each transaction having ordering information and said computer data structures further comprising information indicating number of transactions in the transaction group, and information about the ordering information of the different transactions.

27. A computer program product comprising a non-transitory computer useable medium including a computer readable program, for detecting patterns in input data containing a set of transactions, each transaction having at least one item and items possibly having taxonomy parents, the set of transactions being partitioned into subsets, wherein the computer readable program when executed on a computer causes the computer to:
provide input data in computer data structures having
a list of identifiers of different items in the subsets of transactions,
information indicating number of identifiers in the list, and
bit field information indicating presence of the different items in the subsets of transactions, each subset including at least two transactions, said bit field information being organized in accordance with the list for facilitating evaluation of patterns with respect to the subsets of transactions; and
evaluate a candidate pattern using bit map operations on the bit field information of the computer data structures.

28. The computer program product of claim 27, wherein the instructions to provide input data contains instructions to do at least one of the following: read said data structures from a storage medium; and process input data to form said data structures.

29. The computer program product of claim 27, further causing the computer to take into account evaluation information of a parent candidate pattern of said candidate pattern when evaluating said candidate pattern.

30. The computer program product of claim 27, further causing the computer to determine whether items defined by positive item constraints are present in transactions in connection with evaluating the candidate pattern.

31. The computer program product of claim 27, further causing the computer to evaluate a subset of similar candidate patterns, said set containing at least two candidate patterns, together with respect to the computer data structures.

32. The computer program product of claim 27, further causing the computer to determine whether items occur in a same order in the candidate pattern and in transactions of said computer data structures.

* * * * *